US012215410B2

(12) United States Patent
Tanaka et al.

(10) Patent No.: US 12,215,410 B2
(45) Date of Patent: Feb. 4, 2025

(54) GRAIN ORIENTED ELECTRICAL STEEL SHEET, FORMING METHOD FOR INSULATION COATING OF GRAIN ORIENTED ELECTRICAL STEEL SHEET, AND PRODUCING METHOD FOR GRAIN ORIENTED ELECTRICAL STEEL SHEET

(71) Applicant: NIPPON STEEL CORPORATION, Tokyo (JP)

(72) Inventors: Ichiro Tanaka, Tokyo (JP); Takashi Kataoka, Tokyo (JP); Kazutoshi Takeda, Tokyo (JP); Tomoya Suenaga, Tokyo (JP); Yuki Kunita, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 876 days.

(21) Appl. No.: 17/422,517

(22) PCT Filed: Jan. 16, 2020

(86) PCT No.: PCT/JP2020/001238
§ 371 (c)(1),
(2) Date: Jul. 13, 2021

(87) PCT Pub. No.: WO2020/149356
PCT Pub. Date: Jul. 23, 2020

(65) Prior Publication Data

US 2022/0090241 A1 Mar. 24, 2022

(30) Foreign Application Priority Data

Jan. 16, 2019 (JP) ................................ 2019-005237

(51) Int. Cl.
*C22C 38/06* (2006.01)
*C21D 3/04* (2006.01)
(Continued)

(52) U.S. Cl.
CPC ................ *C22C 38/06* (2013.01); *C21D 3/04* (2013.01); *C21D 8/0205* (2013.01);
(Continued)

(58) Field of Classification Search
None
See application file for complete search history.

(56) References Cited

U.S. PATENT DOCUMENTS

| | | | |
|---|---|---|---|
| 4,713,123 | A | 12/1987 | Inokuti et al. |
| 2013/0061985 | A1 | 3/2013 | Iwanaga et al. |

FOREIGN PATENT DOCUMENTS

| | | |
|---|---|---|
| EP | 0 565 029 A1 | 10/1993 |
| JP | 62-30302 A | 2/1987 |

(Continued)

*Primary Examiner* — Anthony M Liang
(74) *Attorney, Agent, or Firm* — Birch, Stewart, Kolasch & Birch, LLP

(57) ABSTRACT

A grain oriented electrical steel sheet includes a base steel sheet, an oxide layer, and a tension-insulation coating. When the iron oxide layer is analyzed by a fourier transform infrared spectroscopy, an absorbance $A_{650}$ at 650 $cm^{-1}$ and an absorbance $A_{1250}$ at 1250 $cm^{-1}$ satisfy $0.2 \le A_{650}/A_{1250} \le 5.0$. Moreover, a magnetic flux density B8 in a rolling direction of the grain oriented electrical steel sheet is 1.90 T or more.

13 Claims, 3 Drawing Sheets

(51) Int. Cl.

| | |
|---|---|
| ***C21D 8/02*** | (2006.01) |
| ***C21D 9/46*** | (2006.01) |
| ***C22C 38/00*** | (2006.01) |
| ***C22C 38/02*** | (2006.01) |
| ***C22C 38/04*** | (2006.01) |
| ***H01F 1/147*** | (2006.01) |

(52) U.S. Cl.

CPC ......... *C21D 8/0226* (2013.01); *C21D 8/0236* (2013.01); *C21D 9/46* (2013.01); *C22C 38/001* (2013.01); *C22C 38/002* (2013.01); *C22C 38/02* (2013.01); *C22C 38/04* (2013.01); *H01F 1/147* (2013.01); *C21D 2201/05* (2013.01); *C22C 2202/02* (2013.01)

(56) References Cited

FOREIGN PATENT DOCUMENTS

| | | | |
|---|---|---|---|
| JP | 2-236267 | A | 9/1990 |
| JP | 5-311453 | A | 11/1993 |
| JP | 8-191010 | A | 7/1996 |
| JP | 2000-38615 | A | 2/2000 |
| JP | 2001-303215 | A | 10/2001 |
| JP | 2002-249880 | A | 9/2002 |
| JP | 2003-313644 | A | 11/2003 |
| KR | 10-2013-0002354 | A | 1/2013 |
| KR | 10-2015-0074860 | A | 7/2015 |

GRAIN ORIENTED ELECTRICAL STEEL SHEET, FORMING METHOD FOR INSULATION COATING OF GRAIN ORIENTED ELECTRICAL STEEL SHEET, AND PRODUCING METHOD FOR GRAIN ORIENTED ELECTRICAL STEEL SHEET

TECHNICAL FIELD

The present invention relates to a grain oriented electrical steel sheet, a forming method for an insulation coating of a grain oriented electrical steel sheet, and a producing method for a grain oriented electrical steel sheet.

Priority is claimed on Japanese Patent Application No. 2019-005237, filed on Jan. 16, 2019, and the content of which is incorporated herein by reference.

BACKGROUND ART

A grain oriented electrical steel sheet is the steel sheet where silicon (Si) of approximately 0.5 to 7 mass % is included and crystal orientation is aligned with {110}<001> orientation (Goss orientation) by utilizing a phenomenon called secondary recrystallization. Herein, the {110}<001> orientation represents that {110} plane of crystal is aligned parallel to a rolled surface and <001> axis of crystal is aligned parallel to a rolling direction.

The grain oriented electrical steel sheet is mainly used for an iron core of a transformer and the like as a soft magnetic material. Since the grain oriented electrical steel sheet significantly influences a performance of the transformer, investigation has been eagerly carried out in order to improve excitation characteristics and iron loss characteristics of the grain oriented electrical steel sheet.

A typical method for producing the grain oriented electrical steel sheet is as follows.

A steel piece with a predetermined composition is heated and hot-rolled to obtain a hot rolled steel sheet. The hot rolled steel sheet is hot-band-annealed as necessary, and then is cold-rolled to obtain a cold rolled steel sheet. The cold rolled steel sheet is decarburization-annealed to activate primary recrystallization. A decarburization annealed steel sheet after the decarburization annealing is final-annealed to activate the secondary recrystallization.

After the decarburization annealing and before the final annealing, aqueous slurry including an annealing separator whose main component is MgO is applied to a surface of the decarburization annealed steel sheet, and then is dried. The decarburization annealed steel sheet is coiled, and then is final-annealed. During the final annealing, MgO included in the annealing separator is reacted to $SiO_2$ included in an internally oxidized layer formed on a surface of the steel sheet by the decarburization annealing, and thereby, a primary layer (referred to as "glass film" or "forsterite film") which mainly includes forsterite ($Mg_2SiO_4$) is formed on the surface of the steel sheet. In addition, after forming the glass film (that is, after the final annealing), a solution which mainly includes colloidal silica and phosphate for instance is applied to the surface of the final annealed steel sheet and is baked, and thereby, a tension-insulation coating (referred to as "secondary layer") is formed.

The above glass film functions as an insulator and also improves adhesion of the tension-insulation coating formed on the glass film. The tension is imparted to the base steel sheet by adhering the glass film, the tension-insulation coating, and the base steel sheet. As a result, the iron loss as the grain oriented electrical steel sheet decreases.

However, since the glass film is a non-magnetic material, the existence of the glass film is unfavorable from a magnetic standpoint. Moreover, an interface between the base steel sheet and the glass film has intruding structure such that the glass film is intricately intertwined therewith, and the intruding structure tends to suppress domain wall motion when the grain oriented electrical steel sheet is magnetized. Thus, the existence of the glass film may cause an increase in the iron loss.

For instance, in a case where the formation of the glass film is suppressed, the formation of the intruding structure may be suppressed, and thus, the domain wall may easily move during being magnetized. However, in a case where the formation of the glass film is simply suppressed, the adhesion of the tension-insulation coating is not ensured, and thus, the sufficient tension is not imparted to the base steel sheet. As a result, it is difficult to reduce the iron loss.

As described above, at present, in a case where the glass film is removed from the grain oriented electrical steel sheet, the domain wall may be easily moved, and thus, it is expected that the magnetic characteristics are improved. On the other hand, in the above case, the tension is hardly imparted to the base steel sheet, and thus, it is unavoidable that the magnetic characteristics (especially, the iron loss characteristics) deteriorate. Therefore, in a case where the grain oriented electrical steel sheet in which the glass film is removed whereas the coating adhesion is ensured is realized, it is expected that the magnetic characteristics are improved.

In the past, it has been investigated to improve the adhesion of the tension-insulation coating for the grain oriented electrical steel sheet without the glass film.

For instance, Patent Document 1 discloses technique to wash a steel sheet by being immersed in aqueous solution of 2 to 30% as sulfuric acid concentration with sulfuric acid or sulfate before forming a tension-insulation coating. Patent Document 2 discloses technique to conduct pretreatment for a steel sheet surface using oxidizing acid before forming a tension-insulation coating. Patent Document 3 discloses a grain oriented silicon steel sheet where an externally oxidized layer containing mainly silica is included and where metallic iron of 30% or less in cross-sectional area fraction is included in the externally oxidized layer. Patent Document 4 discloses a grain oriented electrical steel sheet where fine linear grooves are directly formed on a base steel surface of the grain oriented electrical steel sheet and where the fine linear grooves are with depth of 0.05 to 2 μm and with an interval of 0.05 to 2 μm.

RELATED ART DOCUMENTS

Patent Documents

[Patent Document 1] Japanese Unexamined Patent Application, First Publication No. H05-311453

[Patent Document 2] Japanese Unexamined Patent Application, First Publication No. 2002-249880

[Patent Document 3] Japanese Unexamined Patent Application, First Publication No. 2003-313644

[Patent Document 4] Japanese Unexamined Patent Application, First Publication No. 2001-303215

SUMMARY OF INVENTION

Technical Problem to be Solved

As described above, the grain oriented electrical steel sheet without the glass film is inferior in the adhesion of the tension-insulation coating. For instance, in a case where the above grain oriented electrical steel sheet is held for long time, the tension-insulation coating may be delaminated. In the case, the tension is not imparted to the base steel sheet. For the grain oriented electrical steel sheet, it is exceedingly important to improve the adhesion of the tension-insulation coating.

The techniques disclosed in Patent Document 1 to Patent Document 4 intend to improve the adhesion of the tension-insulation coating respectively. However, in the techniques, it is unclear that the adhesion is stably obtained and that the effect in improving the iron loss is obtained thereby. The above techniques are not enough to obtain the effect.

The present invention has been made in consideration of the above mentioned situations. An object of the invention is to provide the grain oriented electrical steel sheet excellent in the adhesion of the tension-insulation coating even without the glass film (forsterite film). In addition, an object of the invention is to provide the method for forming the above insulation coating and for producing the above grain oriented electrical steel sheet.

Solution to Problem

An aspect of the present invention employs the following.

(1) A grain oriented electrical steel sheet according to an aspect of the present invention, the grain oriented electrical steel sheet without a forsterite film includes:

a base steel sheet;

an oxide layer arranged in contact with the base steel sheet; and a tension-insulation coating arranged in contact with the oxide layer, wherein the base steel sheet includes, as a chemical composition, by mass %, 2.5 to 4.0% of Si, 0.05 to 1.00% of Mn, 0 to 0.01% of C, 0 to 0.005% of S+Se, 0 to 0.01% of sol.Al, 0 to 0.005% of N, 0 to 0.03% of Bi, 0 to 0.03% of Te, 0 to 0.03% of Pb, 0 to 0.50% of Sb, 0 to 0.50% of Sn, 0 to 0.50% of Cr, 0 to 1.0% of Cu, and a balance consisting of Fe and impurities, the oxide layer is an iron oxide layer, when the iron oxide layer is analyzed by a fourier transform infrared spectroscopy, when $A_{650}$ is an absorbance of an absorption peak detected at 650 $cm^{-1}$ in an infrared absorption spectrum, and when $A_{1250}$ is an absorbance of an absorption peak detected at 1250 $cm^{-1}$ in the infrared absorption spectrum, the $A_{650}$ and the $A_{1250}$ satisfy $0.2 \le A_{650}/A_{1250} \le 5.0$, and a magnetic flux density B8 in a rolling direction of the grain oriented electrical steel sheet is 1.90 T or more.

(2) In the grain oriented electrical steel sheet according to (1), an average thickness of the iron oxide layer may be 200 to 500 nm.

(3) A forming method for an insulation coating of a grain oriented electrical steel sheet according to an aspect of the present invention, the forming method for the insulation coating of the grain oriented electrical steel sheet without a forsterite film includes an insulation coating forming process of forming a tension-insulation coating on a steel substrate, wherein, in the insulation coating forming process, a solution for forming the tension-insulation coating is applied to an oxide layer of the steel substrate and the solution is baked, wherein the steel substrate includes a base steel sheet and the oxide layer arranged in contact with the base steel sheet, the base steel sheet includes, as a chemical composition, by mass %, 2.5 to 4.0% of Si, 0.05 to 1.00% of Mn, 0 to 0.01% of C, 0 to 0.005% of S+Se, 0 to 0.01% of sol.Al, 0 to 0.005% of N, 0 to 0.03% of Bi, 0 to 0.03% of Te, 0 to 0.03% of Pb, 0 to 0.50% of Sb, 0 to 0.50% of Sn, 0 to 0.50% of Cr, 0 to 1.0% of Cu, and a balance consisting of Fe and impurities, the oxide layer is an iron oxide layer, and when the iron oxide layer is analyzed by a fourier transform infrared spectroscopy, when $A_{650}$ is an absorbance of an absorption peak detected at 650 $cm^{-1}$ in an infrared absorption spectrum, and when $A_{1250}$ is an absorbance of an absorption peak detected at 1250 $cm^{-1}$ in the infrared absorption spectrum, the $A_{650}$ and the $A_{1250}$ satisfy $0.2 \le A_{650}/A_{1250} \le 5.0$.

(4) In the forming method for the insulation coating of the grain oriented electrical steel sheet according to (3), an average thickness of the iron oxide layer may be 200 to 500 nm.

(5) A producing method for a grain oriented electrical steel sheet according to an aspect of the present invention, the producing method for the grain oriented electrical steel sheet without a forsterite film includes a hot rolling process of heating and thereafter hot-rolling a steel piece to obtain a hot rolled steel sheet, a hot band annealing process of optionally annealing the hot rolled steel sheet to obtain a hot band annealed steel sheet, a cold rolling process of cold-rolling the hot rolled steel sheet or the hot band annealed steel sheet by cold-rolling once or by cold-rolling plural times with an intermediate annealing to obtain a cold rolled steel sheet, a decarburization annealing process of decarburization-annealing the cold rolled steel sheet to obtain a decarburization annealed steel sheet, a final annealing process of applying an annealing separator to the decarburization annealed steel sheet and thereafter final-annealing the decarburization annealed steel sheet to obtain a final annealed steel sheet, an oxidizing process of conducting a washing treatment, a pickling treatment, and a heat treatment in turn for the final annealed steel sheet to obtain an oxidized steel sheet, an insulation coating forming process of applying a solution for forming a tension-insulation coating to a surface of the oxidized steel sheet and of baking the solution, wherein, in the hot rolling process, the steel piece includes, as a chemical composition, by mass %, 2.5 to 4.0% of Si, 0.05 to 1.00% of Mn, 0.02 to 0.10% of C, 0.005 to 0.080% of S+Se, 0.010 to 0.07% of sol.Al, 0.005 to 0.020% of N, 0 to 0.03% of Bi, 0 to 0.03% of Te, 0 to 0.03% of Pb, 0 to 0.50% of Sb, 0 to 0.50% of Sn, 0 to 0.50% of Cr, 0 to 1.0% of Cu, and a balance consisting of Fe and impurities, and wherein, in the oxidizing process, as the washing treatment, a surface of the final annealed steel sheet is washed, as the pickling treatment, the final annealed steel sheet is pickled using a sulfuric acid of 5 to 20 mass %, and as the heat treatment, the final annealed steel sheet is held in a temperature range of 700 to 850° C. for 10 to 50 seconds in an atmosphere where an oxygen concentration is 5 to 21 volume % and a dew point is −10 to 30° C.

(6) In the producing method for the grain oriented electrical steel sheet according to (5), in the final annealing process, the annealing separator may include MgO and $Al_2O_3$ of 85 mass % or more in total, MgO:$Al_2O_3$ which is a mass ratio of MgO and $Al_2O_3$ may satisfy 3:7 to 7:3, and the annealing separator may include a bismuth chloride of 0.5 to 15 mass % as compared with a total amount of MgO and $Al_2O_3$.

(7) In the producing method for the grain oriented electrical steel sheet according to (5), in the final annealing process, the annealing separator may include MgO of 60 mass % or more, and a forsterite film formed on a surface may be removed by grinding or pickling the surface of the final annealed steel sheet after final annealing.

(8) In the producing method for the grain oriented electrical steel sheet according to according to any one of (5) to (7), in the decarburization annealing process, when S1 is an average heating rate in units of ° C./second in a temperature range of 500° C. or more and less than 600° C. during raising a temperature of the cold rolled steel sheet and when S2 is an average heating rate in units of ° C./second in a temperature range of 600° C. or more and 700° C. or less during raising the temperature of the cold rolled steel sheet, the S1 and the S2 may satisfy $300 \leq S1 \leq 1000$, $1000 \leq S2 \leq 3000$, and $1.0 \leq S2/S1 \leq 10.0$.

(9) In the producing method for the grain oriented electrical steel sheet according to according to any one of (5) to (8), in the hot rolling process, the steel piece may include, as the chemical composition, by mass %, at least one selected from a group consisting of 0.0005 to 0.03% of Bi, 0.0005 to 0.03% of Te, and 0.0005 to 0.03% of Pb.

Effects of Invention

According to the above aspects of the present invention, it is possible to provide the grain oriented electrical steel sheet excellent in the adhesion of the tension-insulation coating even without the glass film (forsterite film). In addition, it is possible to provide the method for forming the above insulation coating and for producing the above grain oriented electrical steel sheet.

Specifically, according to the above aspects of the present invention, the glass film is not included, the formation of the intruding structure is suppressed, and thereby, the domain wall can easily move. In addition, the morphology of the iron oxide layer is controlled, the adhesion of the tension-insulation coating is ensured, and thereby, the sufficient tension can be imparted to the base steel sheet. As a result, it is possible to obtain the excellent magnetic characteristics as the grain oriented electrical steel sheet.

DETAILED DESCRIPTION OF PREFERRED EMBODIMENTS

Hereinafter, a preferred embodiment of the present invention is described in detail. However, the present invention is not limited only to the configuration which is disclosed in the present embodiment, and various modifications are possible without departing from the aspect of the present invention. In addition, the limitation range as described below includes a lower limit and an upper limit thereof. However, the value represented by "more than" or "less than" does not include in the limitation range. Unless otherwise noted, "%" of the chemical composition represents "mass %".

Moreover, in the embodiment and the drawings, duplicate explanations in regard to the component which has the substantial same function are omitted by adding the same reference sign.

The present inventors have made a thorough investigation to improve the adhesion of the tension-insulation coating for the grain oriented electrical steel sheet without the glass film (forsterite film). As a result, it has been found that, even without the glass film, the coating adhesion can be ensured by forming a favorable iron oxide layer, the favorable iron oxide layer being formed by the following treatments. Specifically, a final annealed steel sheet without the glass film after final annealing is subjected to washing treatment of washing a surface thereof, to pickling treatment using sulfuric acid, and then to heat treatment in predetermined atmosphere.

Moreover, it has been found that, in the grain oriented electrical steel sheet with the above specific iron oxide layer, alignment degree of crystal orientation of the base steel sheet considerably influences the magnetic characteristics after forming the tension-insulation coating and after magnetic domain refining treatment, and that the above influence is more than expected. The present inventors have also found that it is possible to preferably improve the magnetic characteristics by controlling a heating rate for decarburization annealing and/or by including an element increasing inhibitor intensity as chemical composition of a steel piece.

<Grain Oriented Electrical Steel Sheet>

Figure 1A:
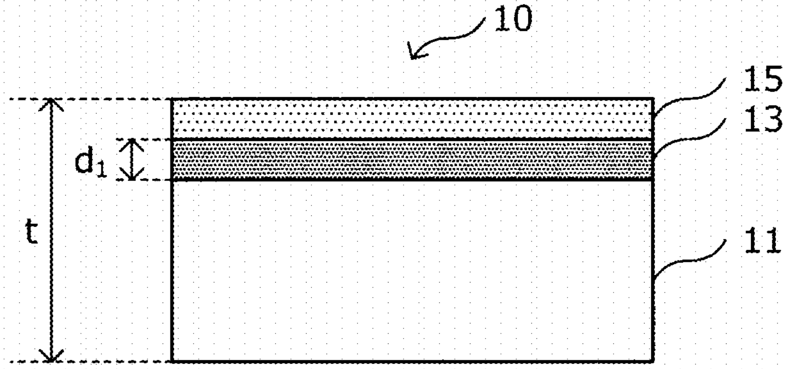
FIG. 1A is a cross-sectional illustration showing a grain oriented electrical steel sheet according to an embodiment of the present invention.
Figure 1B:
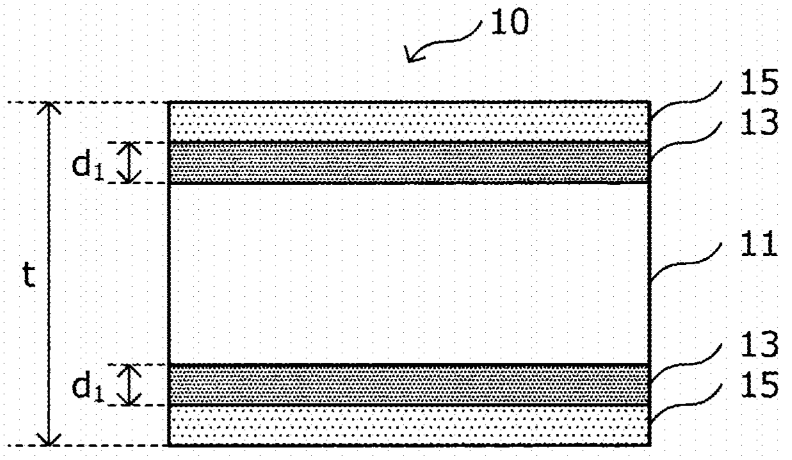
FIG. 1B is a cross-sectional illustration showing a modification of the grain oriented electrical steel sheet according to the embodiment.

The main features of the grain oriented electrical steel sheet according to the embodiment are described with reference to FIG. 1A and FIG. 1B. FIG. 1A and FIG. 1B are illustrations schematically showing the structure of grain oriented electrical steel sheet according to the embodiment.

As schematically shown in FIG. 1A, the grain oriented electrical steel sheet 10 according to the embodiment includes the base steel sheet 11, the iron oxide layer 13 arranged in contact with the base steel sheet 11, and the tension-insulation coating 15 arranged in contact with the iron oxide layer 13. In the grain oriented electrical steel sheet 10, the glass film (forsterite film) does not exist between the base steel sheet 11 and the tension-insulation coating 15. In the grain oriented electrical steel sheet 10, the iron oxide layer 13 and the tension-insulation coating 15 may be formed on at least one sheet surface of the base steel sheet 11. In general, the iron oxide layer 13 and the tension-insulation coating 15 are formed on both sheet surfaces of the base steel sheet 11 as schematically shown in FIG. 1B.

Hereinafter, the grain oriented electrical steel sheet 10 according to the embodiment is explained focusing on its characteristic features. In the following description, detailed description of known features and features which can be accomplished by the skilled person may be omitted.

(Base Steel Sheet 11)

The base steel sheet 11 is obtained by using steel piece with a predetermined chemical composition and applying predetermined production conditions, and thus, the chemical composition and the texture are controlled. The chemical composition of the base steel sheet 11 is described in detail below.

(Iron Oxide Layer 13)

The iron oxide layer 13 is the oxide layer which acts as an intermediate layer between the base steel sheet 11 and the tension-insulation coating 15 in the grain oriented electrical steel sheet 10 according to the embodiment. The iron oxide layer 13 mainly includes iron oxides. The constituent phase therein is not particularly limited. In the grain oriented electrical steel sheet 10 according to the embodiment, the iron oxide layer 13 is defined as the oxide layer which satisfies $0.2 \le A_{650}/A_{1250} \le 5.0$ described later. On the other hand, the forsterite film, the oxide layer except for the iron oxide layer, and the like do not satisfy $0.2 \le A_{650}/A_{1250} \le 5.0$.

The iron oxide layer 13 mainly includes iron oxides such as magnetite ($Fe_3O_4$), hematite ($Fe_2O_3$), fayalite ($Fe_2SiO_4$). In addition to the above iron oxides, silicon oxide ($SiO_2$) and the like may be included. The existence of the iron oxide layer 13 can be confirmed by conducting the fourier transform infrared spectroscopy on the surface where the tension-insulation coating 15 is not formed (surface where the tension-insulation coating 15 is removed).

The iron oxides are formed, for instance, by reacting oxygen with the surface of the final annealed steel sheet. The iron oxide layer 13 mainly includes the iron oxides, and thereby, the adhesion with the base steel sheet 11 is improved. In general, it is difficult to improve the adhesion between metals and ceramics. However, in the grain oriented electrical steel sheet 10 according to the embodiment, the iron oxide layer 13 is arranged between the base steel sheet 11 and the tension-insulation coating 15 which is a kind of ceramic, and thereby, the adhesion of the tension-insulation coating 15 is improved even without the glass film.

The average thickness of the iron oxide layer 13 (the average thickness di in FIG. 1A and FIG. 1B) is preferably in the range of 200 to 500 nm, for instance. When the average thickness di of the iron oxide layer 13 is 200 nm or more, the adhesion can be favorably improved. On the other hand, when the average thickness di of the iron oxide layer 13 is more than 500 nm, the iron oxide layer 13 may be excessively thick, and the delamination may partially occur. The average thickness di of the iron oxide layer 13 is preferably 220 nm or more, and more preferably 250 nm or more. Moreover, the average thickness di of the iron oxide layer 13 is preferably 480 nm or less, and more preferably 450 nm or less.

The above average thickness di of the iron oxide layer 13 may be measured by observing the distribution of bond between iron and oxygen using X-ray photoelectron spectroscopy (XPS) for instance. Specifically, the XPS spectrum is measured while sputtering from the surface, and the average thickness di of the iron oxide layer 13 may be regarded as the range from the position where the Fe—O peak which is appeared at 712 eV is detected in the spectrum to the position where the above Fe—O peak is substituted for the metallic Fe peak which is appeared at 708 eV in the spectrum.

When the measured sample has the tension-insulation coating 15 as the outermost layer, XPS analysis may be conducted after reducing the thickness of the tension-insulation coating 15. For instance, the thickness of the tension-insulation coating 15 is preliminary confirmed from the cross section along the thickness direction of the grain oriented electrical steel sheet 10, and then, the surface of the grain oriented electrical steel sheet 10 is mechanically parallel-polished so that the thickness of the tension-insulation coating 15 becomes less than 0.1 μm. Thereafter, XPS analysis may be conducted using the above grain oriented electrical steel sheet 10. The spectrum originated from the tension-insulation coating 15 may be detected immediately after starting XPS analysis (immediately after starting sputtering). With the passage of time, the Fe—O peak which is appeared at 712 eV and which is originated from the iron oxide layer 13 is detected. With more passage of time, the metallic Fe peak which is appeared at 708 eV and which is originated from the base steel sheet 11 is detected. Based on the above Fe—O peak and the above metallic Fe peak, the average thickness di of the iron oxide layer 13 may be measured as described above.

The constituent phase in the iron oxide layer 13 is not particularly limited. As necessary, it is possible to identify the constituent phase by X-ray crystallography, XPS analysis, and the like.

(Tension-Insulation Coating 15)

The tension-insulation coating 15 is arranged on the surface of the iron oxide layer 13. The tension-insulation coating 15 ensures the electrical insulation for the grain oriented electrical steel sheet 10, and thereby, the eddy current loss is reduced. As a result, the iron loss characteristics are improved. In addition to the electrical insulation, the tension-insulation coating 15 improves corrosion resistance, heat resistance, slippage, and the like for the grain oriented electrical steel sheet 10.

Moreover, the tension-insulation coating 15 applies the tension to the base steel sheet 11. When the tension is applied to the base steel sheet 11, the magnetic domain wall motion becomes easier during the magnetization process, and thus, the iron loss characteristics of the grain oriented electrical steel sheet 10 are improved.

The average thickness of the tension-insulation coating 15 is not particularly limited, but may be 0.1 to 10 μm for instance.

Moreover, the continuous wave laser beam or the electron beam may be irradiated on the surface of the tension-insulation coating 15, in order to refine the magnetic domain.

For instance, the tension-insulation coating 15 is formed by applying the insulation coating forming solution which mainly includes metal phosphate and colloidal silica to the surface of the iron oxide layer 13 arranged in contact with the base steel sheet 11 and by baking the above solution.

<Thickness of Grain Oriented Electrical Steel Sheet 10>

The average thickness of the grain oriented electrical steel sheet 10 according to the embodiment (the average thickness tin FIG. 1A and FIG. 1B) is not particularly limited, but may be 0.17 to 0.35 mm for instance.

<Chemical Composition of Base Steel Sheet 11>

The chemical composition of the base steel sheet 11 of the grain oriented electrical steel sheet 10 according to the embodiment is described in detail. Hereinafter, "%" of the amount of respective elements as described below expresses "mass %" unless otherwise mentioned.

In the grain oriented electrical steel sheet 10 according to the embodiment, the base steel sheet 11 includes, as the chemical composition, base elements, optional elements as necessary, and a balance consisting of Fe and impurities.

In the embodiment, the base steel sheet 11 includes Si and Mn as the base elements (main alloying elements).

(2.5 to 4.0% of Si)

Si (silicon) is an element which increases the electric resistance of steel and which reduces the eddy current loss. When the Si content is less than 2.5%, the above effect to reduce the eddy current loss is not sufficiently obtained. On the other hand, when the Si content is more than 4.0%, the cold workability of steel deteriorates. Thus, in the embodiment, the Si content of the base steel sheet 11 is to be 2.5 to 4.0%. The Si content is preferably 2.7% or more, and more preferably 2.8% or more. Moreover, the Si content is preferably 3.9% or less, and more preferably 3.8% or less.

(0.05 to 1.0% of Mn)

Mn (manganese) forms MnS and MnSe in the production processes by bonding to S and/or Se explained later. These precipitates act as the inhibitor (inhibitor of normal grain growth) and induce the secondary recrystallization in steel during final annealing. Moreover, Mn is an element which improves the hot workability of steel. When the Mn content is less than 0.05%, the above is not sufficiently obtained. On the other hand, when the Mn content is more than 1.0%, the secondary recrystallization does not occur and the magnetic characteristics of steel deteriorate. Thus, in the embodiment, the Mn content of the base steel sheet 11 is to be 0.05 to 1.0%. The Mn content is preferably 0.06% or more. Moreover, the Mn content is preferably 0.50% or less.

In the embodiment, the base steel sheet 11 may include the impurities. The impurities correspond to elements which are contaminated during industrial production of steel from ores and scrap that are used as a raw material of steel, or from environment of a production process.

Moreover, in the embodiment, the base steel sheet 11 may include the optional elements in addition to the base elements and the impurities. For example, as substitution for a part of Fe which is the balance, the silicon steel sheet may include the optional elements such as C, S, Se, sol. Al (acid-soluble Al), N, Bi, Te, Pb, Sb, Sn, Cr, and Cu. The optional elements may be included as necessary. Thus, a lower limit of the respective optional elements does not need to be limited, and the lower limit may be 0%. Moreover, even if the optional elements may be included as impurities, the above mentioned effects are not affected.

(0 to 0.01% of C)

C (carbon) is an optional element. C is the element effective for microstructure control until the completion of the decarburization annealing process in the production processes, and thereby, the magnetic characteristics for the grain oriented electrical steel sheet are improved. However, as the final product, when the C content of the base steel sheet 11 is more than 0.01%, the magnetic characteristics for the grain oriented electrical steel sheet 10 deteriorate. Thus, in the embodiment, the C content of the base steel sheet 11 is to be 0.01% or less. The C content is preferably 0.005% or less. On the other hand, the lower limit of the C content of the base steel sheet 11 is not particularly limited, but may be 0%. It is preferable that the C content is as low as possible. However, even when the C content is reduced to less than 0.0001%, the effect for the microstructure control is saturated, and the producing cost increases. Thus, the C content is preferably 0.0001% or more.

(0 to 0.005% in total of S+Se)

S (sulfur) and Se (selenium) are optional elements. S and Se form MnS and MnSe which act as the inhibitor by bonding to Mn in the production processes. However, when the total amount of S and Se of the base steel sheet 11 is more than 0.005%, the inhibitor remains in the base steel sheet 11, and the magnetic characteristics deteriorate. Thus, in the embodiment, the total amount of S and Se of the base steel sheet 11 is to be 0.005% or less. On the other hand, the lower limit of the total amount of S and Se of the base steel sheet 11 is not particularly limited, but may be 0%. It is preferable that the total amount of S and Se is as low as possible. However, even when the total amount of S and Se is reduced to less than 0.0001%, the producing cost increases. Thus, the total amount of S and Se is preferably 0.0001% or more.

(0 to 0.01% of sol.Al)

Sol. Al (acid soluble Al) is an optional element. Al forms AlN which acts as the inhibitor by bonding to N in the production processes. However, when the sol.Al content is more than 0.01%, the inhibitor excessively remains in the base steel sheet 11, and the magnetic characteristics deteriorate. Thus, in the embodiment, the sol.Al content of the base steel sheet 11 is to be 0.01% or less. The sol.Al content is preferably 0.005% or less, and more preferably 0.004% or less. The lower limit of the sol.Al content of the base steel sheet 11 is not particularly limited, but may be 0%. However, in order to reduce the sol.Al content to less than 0.0001%, the producing cost increases. Thus, the sol.Al content is preferably 0.0001% or more.

(0 to 0.005% of N)

N (nitrogen) is an optional element. N forms AlN which acts as the inhibitor by bonding to Al in the production processes. However, when the N content is more than 0.005%, the inhibitor excessively remains in the base steel sheet 11, and the magnetic characteristics deteriorate. Thus, in the embodiment, the N content of the base steel sheet 11 is to be 0.005% or less. The N content is preferably 0.004% or less. The lower limit of the N content of the base steel sheet 11 is not particularly limited, but may be 0%. However, in order to reduce the N content to less than 0.0001%, the producing cost increases. Thus, the N content is preferably 0.0001% or more.

(0 to 0.03% of Bi)

(0 to 0.03% of Te)

(0 to 0.03% of Pb)

Bi (bismuth), Te (tellurium), and Pb (lead) are optional elements. When the amount of each of these elements included in the base steel sheet 11 is 0.03% or less, it is possible to favorably improve the magnetic characteristics for the grain oriented electrical steel sheet 10. However, when the amount of each of these elements is more than 0.03% respectively, the steel sheet may become brittle in the higher temperature range. Thus, in the embodiment, the amount of each of these elements included in the base steel sheet 11 is to be 0.03% or less. The lower limit of the amount of each of these elements included in the base steel sheet 11 is not particularly limited, but may be 0%. The lower limit of the amount of each of these elements may be 0.0001%.

(0 to 0.50% of Sb)

(0 to 0.50% of Sn)

(0 to 0.50% of Cr)

(0 to 1.0% of Cu)

Sb (antimony), Sn (tin), Cr (chrome), and Cu (copper) are optional elements. When these elements are included in the base steel sheet 11, it is possible to favorably improve the magnetic characteristics for the grain oriented electrical steel sheet 10. Thus, in the embodiment, it is preferable to control the amount of each of these elements included in the base steel sheet 11 to 0.50% or less of Sb, 0.50% or less of Sn, 0.50% or less of Cr, and 1.0% or less of Cu. The lower limit of the amount of each of these elements included in the base steel sheet 11 is not particularly limited, but may be 0%. In order to favorably obtain the above effect, the amount of each of these elements is preferably 0.0005% or more, and more preferably 0.001% or more.

Herein, at least one of Sb, Sn, Cr, and Cu may be included in the base steel sheet 11. Specifically, the base steel sheet 11 may be include at least one of 0.0005 to 0.50% of Sb, 0.0005 to 0.50% of Sn, 0.0005 to 0.50% of Cr, and 0.0005 to 1.0% of Cu.

In the grain oriented electrical steel sheet, the chemical composition changes relatively drastically (the amount of alloying element decreases) through the decarburization annealing and through the purification annealing during secondary recrystallization. Depending on the element, the amount of the element may decreases through the purification annealing to an undetectable level (1 ppm or less) using the typical analysis method. The above mentioned chemical composition is the chemical composition as the final product (the base steel sheet 11 of the grain oriented electrical steel sheet 10). In general, the chemical composition of the final product is different from the chemical composition of the steel piece (slab) as the starting material.

The chemical composition of the base steel sheet 11 of the grain oriented electrical steel sheet 10 may be measured by typical analytical methods for the steel. For instance, the chemical composition may be measured by using ICP-AES (Inductively Coupled Plasma-Atomic Emission Spectrometer: inductively coupled plasma emission spectroscopy spectrometry). Specifically, it is possible to obtain the chemical composition by conducting the measurement by Shimadzu ICPS-8100 and the like (measurement device) under the condition based on calibration curve prepared in advance using samples with 35 mm square taken from the base steel sheet 11. In addition, C and S may be measured by the infrared absorption method after combustion, and N may be measured by the thermal conductometric method after fusion in a current of inert gas.

The above chemical composition is the composition of the base steel sheet 11 of the grain oriented electrical steel sheet 10. When the grain oriented electrical steel sheet 10 used as the measurement sample has the tension-insulation coating 15 and the iron oxide layer 13 on the surface thereof, the chemical composition is measured after removing the coating and the like by the typical methods.

<Surface Analysis by Fourier Transform Infrared Spectroscopy>

In the grain oriented electrical steel sheet 10 according to the embodiment, the iron oxide layer 13 is arranged between the base steel sheet 11 and the tension-insulation coating 15, and thereby, the iron oxide layer 13, the tension-insulation coating 15, and the base steel sheet 11 adhere tightly, even without the glass film (forsterite film).

Figure 2A:
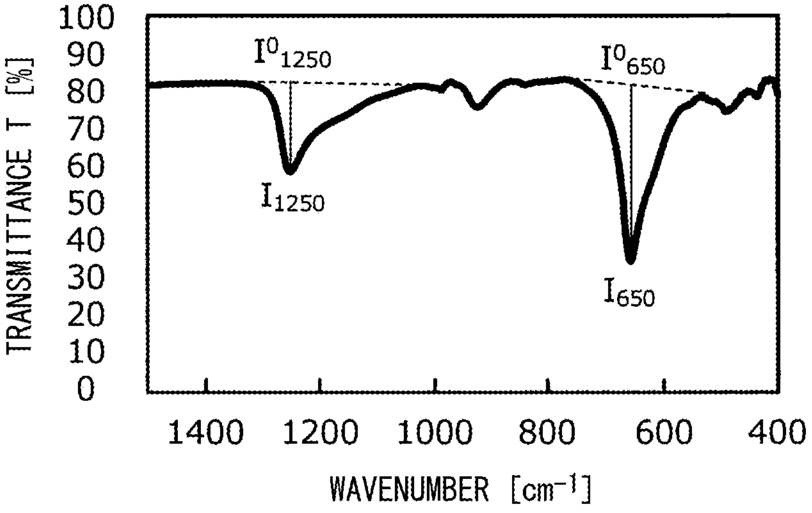
FIG. 2A is an infrared absorption spectrum of a fourier transform infrared spectroscopy.
Figure 2B:
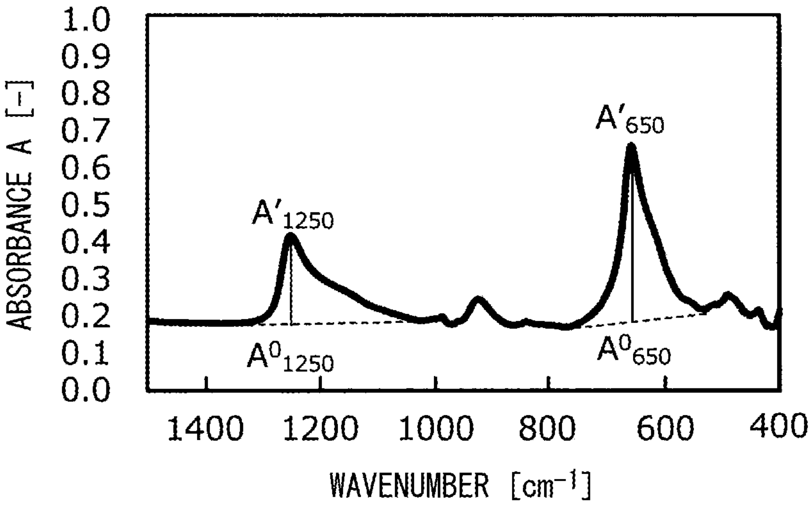
FIG. 2B is an infrared absorption spectrum of a fourier transform infrared spectroscopy.

It is possible to judge whether or not the iron oxide layer 13 is included in the grain oriented electrical steel sheet 10 by the surface analysis using the fourier transform infrared spectroscopy. Specifically, the fourier transform infrared spectroscopy is conduced, and then, the absorbance of specific peak may be confirmed. Hereinafter, the surface analysis by the fourier transform infrared spectroscopy is explained in detail with reference to FIG. 2A and FIG. 2B. FIG. 2A and FIG. 2B show the infrared absorption spectrum of the fourier transform infrared spectroscopy.

When the tension-insulation coating 15 is not included in the grain oriented electrical steel sheet 10 (when the steel sheet is after the oxidizing process and before the insulation coating forming process in the method for producing the grain oriented electrical steel sheet according to the embodiment), the surface of the iron oxide layer 13 is analyzed by known fourier transform infrared spectrophotometer which is commercially available (for instance, Frontier of PERKIN ELMER Frontier and the like).

When the tension-insulation coating 15 is included, the fourier transform infrared spectroscopy may be conducted while reducing the thickness of the measurement sample. For instance, the thickness of the tension-insulation coating 15 is preliminary confirmed from the cross section along the thickness direction of the grain oriented electrical steel sheet 10, and then, the surface of the grain oriented electrical steel sheet 10 is mechanically parallel-polished so that the thickness of the tension-insulation coating 15 becomes less than 0.1 μm. The fourier transform infrared spectroscopy is conducted using the above grain oriented electrical steel sheet 10 after polishing. Thereafter, the measured surface of the measurement sample is mechanically parallel-polished so that the thickness of the analyzed measurement sample is further reduced by approximately 0.05 μm. The fourier transform infrared spectroscopy is conducted again using the measurement sample after polishing. The above analysis and polishing are repeated until the base steel sheet 11 is exposed in the measurement sample. By the above procedure, the iron oxide layer 13 is analyzed by the fourier transform infrared spectrophotometer.

The result of the fourier transform infrared spectroscopy is not affected by the presence or absence of the tension-insulation coating 15. Specifically, it is confirmed that the result of the fourier transform infrared spectroscopy is equivalent between the analysis using the measurement sample where the tension-insulation coating 15 is not included and where the iron oxide layer 13 is the outermost layer and the analysis using the measurement sample where the tension-insulation coating 15 is included and where the iron oxide layer 13 is exposed by the above procedure.

When the fourier transform infrared spectroscopy is conducted, for instance, it is preferable to measure the infrared absorption spectrum of the iron oxide layer 13 by reflection absorption spectroscopy. At this time, the absorption peak detected at 650 $cm^{-1}$ in the infrared absorption spectrum is observed as the absorption peak originated from iron oxides included in the iron oxide layer 13. On the other hand, the absorption peak detected at 1250 $cm^{-1}$ in the infrared absorption spectrum is observed as the absorption peak originated from $SiO_2$. In some case, the position of the wavenumber at which these absorption peaks are detected may shift by about 1 to 2 $cm^{-1}$ from the above wavenumber. However, as shown in FIG. 2A and FIG. 2B, the spectral waveform of the above two absorption peaks is specific, and thus, the skilled person can easily identify the above two absorption peaks from the infrared absorption spectrum.

It is possible to define the absorbance $A_k$ of each absorption peak as following (formula 11), using the intensity Ik (for instance, transmittance Tk (unit: %)) of each absorption peak and the intensity $I^0_k$ (for instance, transmittance $r_k$ (unit: %)) of the base line of each absorption peak as shown in FIG. 2A for instance. Moreover, if the fourier transform infrared spectrophotometer used for the surface analysis is the device which can directly output the absorbance, it is also possible to define the absorbance $A_k$ of each absorption peak as following (formula 11'), using the absorbance $A'_k$ (no unit) of each absorption peak and the absorbance $A^0_k$ (no unit) of the base line of each absorption peak as shown in FIG. 2B for instance.

$$A_k = \log\left(I_k^0/I_k\right) \quad \text{(formula 11)}$$

$$A_k = A_k' - A_k^0 \quad \text{(formula 11')}$$

Based on the above formula 11 and the above formula 11', $A_{650}$ is defined as the absorbance of the absorption peak detected at 650 $cm^{-1}$ of the wavenumber in the infrared absorption spectrum, and $A_{1250}$ is defined as the absorbance of the absorption peak detected at 1250 $cm^{-1}$ of the wavenumber in the infrared absorption spectrum.

The absorption peak detected at 650 $cm^{-1}$ is originated from the iron oxides, and the absorption peak detected at 1250 $cm^{-1}$ is originated from $SiO_2$. Thus, the value of the above $A_{650}$ and the value of the above $A_{1250}$ correspond to the amount of formed iron oxides and the amount of formed $SiO_2$ respectively.

In the case of observing the infrared absorption spectrum which is the relation between the wavenumber ($cm^{-1}$) and the transmittance T (%) as shown in FIG. 2A, it is possible to define the above base line as follows.

The base line of the absorption peak detected at 650 $cm^{-1}$:the line connecting the maximum of the transmittance Tin the wavenumber range of 510 to 560 $cm^{-1}$ and the maximum of the transmittance T in the wavenumber range of 720 to 820 $cm^{-1}$.

The base line of the absorption peak detected at 1250 $cm^{-1}$:the line connecting the maximum of the transmittance Tin the wavenumber range of 1000 to 1100 $cm^{-1}$ and the maximum of the transmittance T in the wavenumber range of 1280 to 1350 $cm^{-1}$.

In the case of observing the infrared absorption spectrum which is the relation between the wavenumber ($cm^{-1}$) and the absorbance A (no unit) as shown in FIG. 2B, it is possible to define the above base line as follows.

The base line of the absorption peak detected at 650 $cm^1$:the line connecting the minimum of the absorbance A in the wavenumber range of 510 to 560 $cm^{-1}$ and the minimum of the absorbance A in the wavenumber range of 720 to 820 $cm^{-1}$.

The base line of the absorption peak detected at 1250 $cm^{-1}$:the line connecting the minimum of the absorbance A in the wavenumber range of 1000 to 1100 $cm^1$ and the minimum of the absorbance A in the wavenumber range of 1280 to 1350 $cm^{-1}$.

In the grain oriented electrical steel sheet 10 according to the embodiment, the following (formula 101) is satisfied when the iron oxide layer 13 is analyzed by the fourier transform infrared spectroscopy.

$$0.2 \le A_{650}/A_{1250} \le 5.0 \quad \text{(formula 101)}$$

In the grain oriented electrical steel sheet 10 according to the embodiment, when the infrared absorption spectrum satisfies the above formula 101, it is judged that the iron oxide layer 13 is included in the grain oriented electrical steel sheet 10. For instance, in regard to the grain oriented electrical steel sheet 10 including the tension-insulation coating 15, when at least one infrared absorption spectrum satisfying the above formula 101 is observed in plural analyses of the fourier transform infrared spectroscopy where the above analysis and polishing are repeated, it is judged that the iron oxide layer 13 is included in the grain oriented electrical steel sheet 10. On the other hand, the forsterite film and the oxide layer except for the iron oxide layer 13 do not satisfy the above formula 101.

When the absorbance ratio $A_{650}/A_{1250}$ is less than 0.2, the amount of formed iron oxides is excessively small as compared with the amount of formed $SiO_2$, the formation of the iron oxide layer 13 is insufficient, and thus, the adhesion of the tension-insulation coating cannot be sufficiently improved. In addition, when the absorbance ratio $A_{650}/A_{1250}$ is more than 5.0, the adhesion of the tension-insulation coating 15 decreases, which is unfavorable. The reason why the adhesion decreases when the absorbance ratio $A_{650}/A_{1250}$ is more than 5.0 is not entirely clear. In a case where the holding time is shorter or the holding temperature is lower in the heat treatment of the oxidizing process explained later, the above situation is occasionally observed. Thus, it is presumed that both the amount of formed iron oxides and the amount of formed $SiO_2$ are insufficient and that the formation of the iron oxides for ensuring the adhesion is insufficient.

In the grain oriented electrical steel sheet 10 according to the embodiment, the absorbance ratio $A_{650}/A_{1250}$ is preferably 0.4 or more, and more preferably 0.6 or more. Moreover, the absorbance ratio $A_{650}/A_{1250}$ is preferably 4.5 or less, and more preferably 4.0 or less.

<Forsterite Film>

The grain oriented electrical steel sheet 10 according to the embodiment does not include the forsterite film. In the embodiment, it may be judged by the following procedure whether or not the grain oriented electrical steel sheet 10 includes the forsterite film Whether or not the grain oriented electrical steel sheet 10 includes the forsterite film may be confirmed by X-ray diffraction method. For instance, the X-ray diffraction may be conducted for the surface after removing the tension-insulation coating 15 and the like from the grain oriented electrical steel sheet 10, and the obtained X-ray diffraction spectrum may be collated with PDF (Powder Diffraction File). The forsterite ($Mg_2SiO_4$) may be identified by JCPDS No. 34-189. In the embodiment, when the main constituent phase in the above X-ray diffraction spectrum is not the forsterite, the grain oriented electrical steel sheet 10 is judged not to include the forsterite film.

In order to only remove the tension-insulation coating 15 from the grain oriented electrical steel sheet 10, the grain oriented electrical steel sheet 10 with the coating may be immersed in hot alkaline solution. Specifically, it is possible to remove the tension-insulation coating 15 and the like from the grain oriented electrical steel sheet 10 by immersing the steel sheet in sodium hydroxide aqueous solution which includes 30 mass % of NaOH and 70 mass % of $H_2O$ at 80° C. for 20 minutes, washing it with water, and then by drying it. In general, only insulation coating is removed by the alkaline solution, and the forsterite film is removed by the acidic solution such as hydrochloric acid. Thus, in a case where the forsterite film is included, by immersing in the above alkaline solution, the tension-insulation coating 15 is removed, and the forsterite film is exposed.

<Magnetic Characteristics>

The magnetic characteristics of the grain oriented electrical steel sheet may be measured on the basis of the epstein test regulated by JIS C2550:2011, the single sheet tester (SST) method regulated by JIS C 2556:2015, and the like. In the grain oriented electrical steel sheet 10 according to the embodiment, the magnetic characteristics may be evaluated by adopting the single sheet tester method regulated by JIS C 2556:2015 among the above methods.

In the grain oriented electrical steel sheet 10 according to the embodiment, the magnetic flux density B8 in the rolling direction (the magnetic flux density under the magnetizing field of 800 A/m) may be 1.90 T or more. The upper limit of the magnetic flux density is not particularly limited, but may be 2.02 T for instance.

As described above, the magnetic characteristics of the grain oriented electrical steel sheet may be measured on the basis of the epstein test regulated by JIS C2550:2011, the single sheet tester (SST) method regulated by JIS C 2556:2015, and the like. When a steel ingot is formed in vacuum furnace and the like for the research and development, it is difficult to take a test piece with the same size as that industrially produced. In the case, for instance, the test piece with a width of 60 mm and a length of 300 mm may be taken, and the measurement may be conducted in accordance with the single sheet tester method. Moreover, the measured value may be multiplied by the correction factor in order to obtain the measured value equivalent to that based on the epstein test. In the embodiment, the measurement is conducted in accordance with the single sheet tester method. The test piece may be taken so that the longitudinal direction is the rolling direction, and the magnetic flux density B8 in the rolling direction may be measured.

<Producing Method for Grain Oriented Electrical Steel Sheet>

Figure 3:
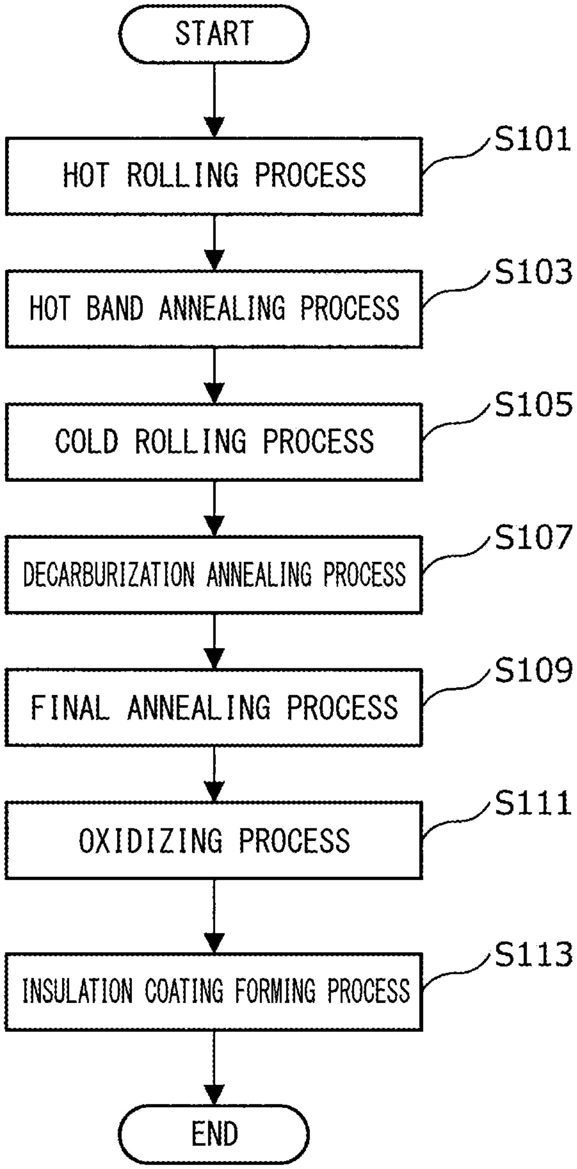
FIG. 3 is a flow chart illustrating a producing method for the grain oriented electrical steel sheet according to the embodiment.

Next, a producing method for the grain oriented electrical steel sheet according to a preferred embodiment of the present invention is described in detail with reference to FIG. 3. FIG. 3 is a flow chart illustrating an instance of the producing method for the grain oriented electrical steel sheet according to the embodiment.

Herein, the producing method for the grain oriented electrical steel sheet 10 is not limited to the following method. The following method is just an instance for producing the grain oriented electrical steel sheet 10.

<Overall Flow of Producing Method for Grain Oriented Electrical Steel Sheet>

The producing method for the grain oriented electrical steel sheet according to the embodiment is for producing the grain oriented electrical steel sheet without the forsterite film, and the overall flow thereof is as follows.

The producing method for the grain oriented electrical steel sheet according to the embodiment includes the following processes, which are shown in FIG. 3.

(S101) Hot rolling process of heating and thereafter hot-rolling a steel piece (slab) including predetermined chemical composition to obtain a hot rolled steel sheet.

(S103) Hot band annealing process of optionally annealing the hot rolled steel sheet to obtain a hot band annealed steel sheet.

(S105) Cold rolling process of cold-rolling the hot rolled steel sheet or the hot band annealed steel sheet by cold-rolling once or by cold-rolling plural times with an intermediate annealing to obtain a cold rolled steel sheet.

(S107) Decarburization annealing process of decarburization-annealing the cold rolled steel sheet to obtain a decarburization annealed steel sheet.

(S109) Final annealing process of applying an annealing separator to the decarburization annealed steel sheet and thereafter final-annealing the decarburization annealed steel sheet to obtain a final annealed steel sheet.

(S111) Oxidizing process of conducting a washing treatment, a pickling treatment, and a heat treatment in turn for the final annealed steel sheet to obtain an oxidized steel sheet.

(S113) Insulation coating forming process of applying a solution for forming a tension-insulation coating to a surface of the oxidized steel sheet and of baking the solution.

The above processes are respectively described in detail. In the following description, when the conditions of each process are not described, known conditions may be appropriately applied.

<Hot Rolling Process>

The hot rolling process (step S101) is the process of heating and thereafter hot-rolling the steel piece (for instance, steel ingot such as slab) including predetermined chemical composition to obtain the hot rolled steel sheet. In the hot rolling process, the steel piece is heat-treated. The heating temperature of the steel piece is preferably in the range of 1200 to 1400° C. The heating temperature of the steel piece is preferably 1250° C. or more, and preferably 1380° C. or more. Subsequently, the heated steel piece is hot-rolled to obtain the hot rolled steel sheet. The average thickness of the hot rolled steel sheet is preferably in the range of 2.0 to 3.0 mm for instance.

In the producing method for the grain oriented electrical steel sheet according to the embodiment, the steel piece includes, as the chemical composition, base elements, optional elements as necessary, and a balance consisting of Fe and impurities. Hereinafter, "%" of the amount of respective elements as described below expresses "mass %" unless otherwise mentioned.

In the producing method for the grain oriented electrical steel sheet according to the embodiment, the steel piece (slab) includes Si, Mn, C, S+Se, sol. Al, and N as the base elements (main alloying elements).

(2.5 to 4.0% of Si)

Si is the element which increases the electric resistance of steel and which reduces the eddy current loss. When the Si content of the steel piece is less than 2.5%, the above effect to reduce the eddy current loss is not sufficiently obtained. On the other hand, when the Si content of the steel piece is more than 4.0%, the cold workability of steel deteriorates. Thus, in the embodiment, the Si content of the steel piece is to be 2.5 to 4.0%. The Si content of the steel piece is preferably 2.7% or more, and more preferably 2.8% or more. Moreover, the Si content of the steel piece is preferably 3.9% or less, and more preferably 3.8% or less.

(0.05 to 1.0% of Mn)

Mn forms MnS and MnSe in the production processes by bonding to S and/or Se explained later. These precipitates act as the inhibitor and induce the secondary recrystallization in steel during final annealing. Moreover, Mn is an element which improves the hot workability of steel. When the Mn content of the steel piece is less than 0.05%, the above is not sufficiently obtained. On the other hand, when the Mn content of the steel piece is more than 1.0%, the secondary recrystallization does not occur and the magnetic characteristics of steel deteriorate. Thus, in the embodiment, the Mn content of the steel piece is to be 0.05 to 1.0%. The Mn content of the steel piece is preferably 0.06% or more. Moreover, the Mn content of the steel piece is preferably 0.50% or less.

(0.02 to 0.10% of C)

C is the element effective for microstructure control until the completion of the decarburization annealing process in the production processes, and thereby, the magnetic characteristics for the grain oriented electrical steel sheet are improved. When the C content of the steel piece is less than 0.02%, or when the C content of the steel piece is more than 0.10%, the above effect in improving the magnetic characteristics are not sufficiently obtained. The C content of the steel piece is preferably 0.03% or more. Moreover, the C content of the steel piece is preferably 0.09% or less.

(0.005 to 0.080% in total of S+Se)

S and Se form MnS and MnSe which act as the inhibitor by bonding to Mn in the production processes. When the total amount of S and Se of the steel piece is less than 0.005%, it is difficult to obtain the effect for forming MnS and MnSe. On the other hand, when the total amount of S and Se is more than 0.080%, the magnetic characteristics deteriorate, and the steel sheet may become brittle in the higher temperature range. Thus, in the embodiment, the total amount of S and Se of the steel piece is to be 0.005 to 0.080%. The total amount of S and Se of the steel piece is preferably 0.006% or more. Moreover, the total amount of S and Se of the steel piece is preferably 0.070% or less.

(0.01 to 0.07% of sol.Al)

Sol. Al forms AlN which acts as the inhibitor by bonding to N in the production processes. When the sol.Al content of the steel piece is less than 0.01%, AlN does not form sufficiently, and thus, the magnetic characteristics deteriorate. On the other hand, when the sol.Al content of the steel piece is more than 0.07%, the magnetic characteristics deteriorate, and the cracks tend to occur during cold rolling. Thus, in the embodiment, the sol.Al content of the steel piece is to be 0.01 to 0.07%. The sol.Al content of the steel piece is preferably 0.02% or more. Moreover, the sol.Al content of the steel piece is preferably 0.05% or less.

(0.005 to 0.020% of N)

N forms AN which acts as the inhibitor by bonding to Al in the production processes. When the N content of the steel piece is less than 0.005%, AlN does not form sufficiently, and thus, the magnetic characteristics deteriorate. On the other hand, when the N content of the steel piece is more than 0.020%, AlN becomes difficult to act as the inhibitor, and thus, the secondary recrystallization becomes difficult to occur. In addition, the cracks tend to occur during cold rolling. Thus, in the embodiment, the N content of the steel piece is to be 0.005 to 0.020%. The N content of the steel piece is preferably 0.012% or less, and more preferably 0.010% or less.

In the producing method for the grain oriented electrical steel sheet according to the embodiment, the steel piece (slab) may include the impurities. The impurities correspond to elements which are contaminated during industrial production of steel from ores and scrap that are used as a raw material of steel, or from environment of a production process.

Moreover, in the embodiment, the steel piece may include the optional elements in addition to the base elements and the impurities. For example, as substitution for a part of Fe which is the balance, the silicon steel sheet may include the optional elements such as Bi, Te, Pb, Sb, Sn, Cr, and Cu. The optional elements may be included as necessary. Thus, a lower limit of the respective optional elements does not need to be limited, and the lower limit may be 0%. Moreover, even if the optional elements may be included as impurities, the above mentioned effects are not affected.

(0 to 0.03% of Bi)

(0 to 0.03% of Te)

(0 to 0.03% of Pb)

Bi, Te, and Pb are optional elements. When the amount of each of these elements included in the steel piece is 0.03% or less, it is possible to favorably improve the magnetic characteristics for the grain oriented electrical steel sheet. However, when the amount of each of these elements is more than 0.03% respectively, the steel sheet may become brittle in the higher temperature range. Thus, in the embodiment, the amount of each of these elements included in the steel piece is to be 0.03% or less. The lower limit of the amount of each of these elements included in the steel piece is not particularly limited, but may be 0%. In order to favorably obtain the above effect, the amount of each of these elements is preferably 0.0005% or more, and more preferably 0.001% or more.

Herein, at least one of Bi, Te, and Pb may be included in the steel piece. Specifically, the steel piece may be include at least one of 0.0005 to 0.03% of Bi, 0.0005 to 0.03% of Te, and 0.0005 to 0.03% of Pb.

(0 to 0.50% of Sb)

(0 to 0.50% of Sn)

(0 to 0.50% of Cr)

(0 to 1.0% of Cu)

Sb, Sn, Cr, and Cu are optional elements. When these elements are included in the steel piece, it is possible to favorably improve the magnetic characteristics for the grain oriented electrical steel sheet. Thus, in the embodiment, it is preferable to control the amount of each of these elements included in the steel piece to 0.50% or less of Sb, 0.50% or less of Sn, 0.50% or less of Cr, and 1.0% or less of Cu. The lower limit of the amount of each of these elements included in the steel piece is not particularly limited, but may be 0%. In order to favorably obtain the above effect, the amount of each of these elements is preferably 0.0005% or more, and more preferably 0.001% or more.

Herein, at least one of Sb, Sn, Cr, and Cu may be included in the steel piece. Specifically, the steel piece may be include at least one of 0.0005 to 0.50% of Sb, 0.0005 to 0.50% of Sn, 0.0005 to 0.50% of Cr, and 0.0005 to 1.0% of Cu.

The chemical composition of the steel piece may be measured by typical analytical methods for the steel. For instance, the chemical composition may be measured on the basis of the above analytical method.

<Hot Band Annealing Process>

The hot band annealing process (step S103) is the process of optionally annealing the hot rolled steel sheet after the hot rolling process to obtain the hot band annealed steel sheet. By conducting the annealing for the hot rolled steel sheet, the recrystallization occurs in steel, and finally, the excellent magnetic characteristics can be obtained.

The heating method is not particularly limited, and known heating method may be adopted. Moreover, the annealing conditions are not particularly limited. For instance, the hot rolled steel sheet may be held in the temperature range of 900 to 1200° C. for 10 seconds to 5 minutes.

The hot band annealing process may be omitted as necessary.

Moreover, after the hot band annealing process and before the cold rolling process explained below, the surface of the hot rolled steel sheet may be pickled.

<Cold Rolling Process>

The cold rolling process (step S105) is the process of cold-rolling the hot rolled steel sheet after the hot rolling process or the hot band annealed steel sheet after the hot band annealing process by cold-rolling once or by cold-rolling plural times with the intermediate annealing to obtain the cold rolled steel sheet. Since the sheet shape of the hot band annealed steel sheet is excellent due to the hot band annealing, it is possible to reduce the possibility such that the steel sheet is fractured in the first cold rolling. The cold rolling may be conducted three or more times, but the producing cost increases. Thus, it is preferable to conduct the cold rolling once or twice.

In the cold rolling process, the cold rolling method for the steel sheet is not particularly limited, and known method may be adopted. For instance, the cold rolling reduction in final cold rolling (cumulative cold rolling reduction without intermediate annealing or cumulative cold rolling reduction after intermediate annealing) may be in the range of 80 to 95%.

Herein, the final cold rolling reduction (%) is defined as follows.

Final cold rolling reduction (%)=(1—Sheet thickness of steel sheet after final cold rolling/Sheet thickness of steel sheet before final cold rolling)×100

When the final cold rolling reduction is less than 80%, the Goss nuclei may not be formed favorably. On the other hand, when the final cold rolling reduction is more than 95%, the secondary recrystallization may be unstable in the final annealing process. Thus, it is preferable that the cold rolling reduction in final cold rolling is 80 to 95%.

When conducting the cold rolling plural times with the intermediate annealing, the reduction in first cold rolling may be 5 to 50%, and the holding in the intermediate annealing may be conducted in the temperature range of 950 to 1200° C. for 30 seconds to 30 minutes.

The average thickness of the cold rolled steel sheet (thickness after cold rolling) is different from the thickness of the grain oriented electrical steel sheet which includes the thickness of the tension-insulation coating. For instance, the average thickness of the cold rolled steel sheet may be 0.10 to 0.50 mm. In the embodiment, even when the cold rolled steel sheet is the thin sheet whose average thickness is less than 0.22 mm, the adhesion of the tension-insulation coating is favorably improved. Thus, the average thickness of the cold rolled steel sheet may be 0.20 mm or less.

In the cold rolling process, the aging treatment may be conducted in order to favorably improve the magnetic characteristics of the grain oriented electrical steel sheet. For instance, since the thickness of the steel sheet is reduced by plural passes in the cold rolling, the steel sheet may be held in the temperature range of 100° C. or more for 1 minute or more at least once in the interval of plural passes. By the aging treatment, it is possible to favorably control the primary recrystallized texture in the decarburization annealing process, and as a result, it is possible to obtain the secondary recrystallized texture where the {110}<001> orientation is favorably developed in the final annealing process.

<Decarburization Annealing Process>

The decarburization annealing process (step S107) is the process of decarburization-annealing the cold rolled steel sheet after the cold rolling process to obtain the decarburization annealed steel sheet. In the decarburization annealing process, the cold rolled steel sheet is annealed under predetermined conditions in order to control the primary recrystallized structure.

In the producing method for the grain oriented electrical steel sheet according to the embodiment, the decarburization annealing process includes two stages which are a heating stage and a holding stage in order to obtain the desired primary recrystallized structure. The conditions in the heating stage and the holding stage are not particularly limited, and known conditions may be adopted.

In the heating stage, the heating rate to reach the decarburization annealing temperature may influence the primary recrystallized texture, and thus, may influence the alignment degree to the Goss orientation after the secondary recrystallization. In grain oriented electrical steel sheet without the glass film according to the embodiment, the alignment degree to the Goss orientation of the base steel sheet considerably influences the magnetic characteristics after forming the tension-insulation coating and after magnetic domain refining treatment. Thus, it is preferable to appropriately control the heating rate of the decarburization annealing as necessary.

Specifically, when the cold rolled steel sheet is heated in the heating stage, it is preferable to control the heating rate in the temperature range of 500 to 700° C. in order to improve the primary recrystallized texture. In particular, it is more preferable to separately control the heating rate in the temperature range of 500° C. or more and less than 600° C. and the heating rate in the temperature range of 600° C. or more and 700° C. or less. From the viewpoint of the effect on the oxide layer formed in the decarburization annealing, the favorable range is different between the average heating rate S1 in the temperature range of 500° C. or more and less than 600° C. and the average heating rate S2 in the temperature range of 600° C. or more and 700° C. or less. In the temperature range of 500° C. or more and less than 600° C., the formation of Mn oxides is influenced in addition to the primary recrystallized texture. In the temperature range of 600° C. or more and 700° C. or less, the formation of $SiO_2$ is influenced in addition to the primary recrystallized texture.

In the embodiment, the average heating rate S1 in the temperature range of 500° C. or more and less than 600° C. is preferably 300° C./second or more and 1000° C./second or less. Moreover, in the temperature range of 600° C. or more and 700° C. or less where $SiO_2$ influencing the reaction to form the glass film (forsterite film) is formed, it is preferable that the detention time of the steel sheet is shortened. Thus, the average heating rate S2 in the temperature range of 600° C. or more and 700° C. or less is preferably 1000° C./second or more and 3000° C./second or less.

It is preferable that the average heating rate S2 is faster than the average heating rate S1. For instance, it is preferable that ratio S2/S1 is more than 1.0 and 10.0 or less.

Specifically, it is preferable that the average heating rate S1 and the average heating rate S2 satisfy all of the following (formula 111) to (formula 113). When all of the following (formula 111) to (formula 113) are satisfied, it is possible to more favorably improve the magnetic characteristics (iron loss characteristics) of the grain oriented electrical steel sheet.

$$300 \leq S1 \leq 1000 \quad \text{(formula 111)}$$

$$1000 \leq S2 \leq 3000 \quad \text{(formula 112)}$$

$$1.0 < S2/S1 \leq 10.0 \quad \text{(formula 113)}$$

In regard to the above formula 111, when the average heating rate S1 is less than 300° C./second, the primary recrystallized texture may be affected, and thus, the magnetic characteristics may deteriorate. On the other hand, when the average heating rate S1 is more than 1000° C./second, the adhesion of the tension-insulation coating may be insufficient. The average heating rate S1 in the temperature range of 500° C. or more and less than 600° C. is more preferably 350° C./second or more. The average heating rate S1 is more preferably 900° C./second or less.

In regard to the above formula 112, when the average heating rate S2 is less than 1000° C./second, the formation of $SiO_2$ influencing the reaction to form the glass film may not be sufficiently suppressed. On the other hand, when the average heating rate S2 is more than 3000° C./second, the decarburization annealing temperature may be overshot. The average heating rate S2 in the temperature range of 600° C. or more and 700° C. or less is more preferably 1200° C./second or more. The average heating rate S2 is more preferably 2500° C./second or less.

In regard to the above formula 113, when the ratio S2/S1 of the average heating rates is 1.0 or less, the magnetic characteristics may deteriorate. On the other hand, when the ratio S2/S1 of the average heating rates is more than 10.0, the temperature control may be difficult. The ratio S2/S1 of the average heating rates is more preferably 1.2 or more. The ratio S2/S1 is more preferably 9.0 or less.

It is preferable that the cold rolled steel sheet is heated to the decarburization annealing temperature of 750 to 950° C. by the above average heating rates.

Other conditions in the heating stage (for instance, heating atmosphere and the like) are not particularly limited. The cold rolled steel sheet may be heated in known moist atmosphere including hydrogen and nitrogen according to common procedure.

In the decarburization annealing process, following the above heating process, the cold rolled steel sheet is held in the decarburization annealing temperature as the holding stage. The conditions in the holding stage are not particularly limited. For instance, the cold rolled steel sheet may be held in the temperature range of 750 to 950° C. for 1 to 5 minutes. Moreover, the atmosphere in the holding stage is not particularly limited. The holding stage may conducted in known moist atmosphere including hydrogen and nitrogen according to common procedure.

<Final Annealing Process>

The final annealing process (step S109) is the process of applying the annealing separator to the decarburization annealed steel sheet after the decarburization annealing process and thereafter final-annealing the decarburization annealed steel sheet to obtain the final annealed steel sheet. In the final annealing, the coiled steel sheet may be held at a higher temperature for a long time in general. Thus, in order to suppress the seizure between the inside and outside of the coiled steel sheet, the annealing separator is applied to the decarburization annealed steel sheet and is dried before the final annealing.

In the final annealing process, the annealing separator applied to the decarburization annealed steel sheet is not particularly limited, and known annealing separator may be adopted. The producing method for the grain oriented electrical steel sheet according to the embodiment is the method for producing the grain oriented electrical steel sheet without the glass film (forsterite film), and thus, the annealing separator which does not form the forsterite film may be adopted. In a case where the annealing separator which forms the forsterite film is adopted, the forsterite film may be removed by grinding or pickling after the final annealing.

(Annealing Separator which does not form Forsterite Film)

As the annealing separator which does not form the glass film (forsterite film), the annealing separator which mainly includes MgO and $Al_2O_3$ may be utilized. For instance, it is preferable that the annealing separator includes MgO and $Al_2O_3$ of 85 mass % or more in total as percent solid, MgO:$Al_2O_3$ which is the mass ratio of MgO and $Al_2O_3$ satisfies 3:7 to 7:3, and the annealing separator includes the bismuth chloride of 0.5 to 15 mass % as compared with the total amount of MgO and $Al_2O_3$ as percent solid. The range of the above mass ratio of MgO and $Al_2O_3$ and the amount of the above bismuth chloride are determined from the viewpoint of obtaining the base steel sheet excellent in the surface smoothness without the glass film.

In regard to the above mass ratio of MgO and $Al_2O_3$, when the amount of MgO exceeds the above range, the glass film may be formed and remained on the steel sheet surface, and thus, the surface of the base steel sheet may not be smoothed. Moreover, in regard to the above mass ratio of MgO and $Al_2O_3$, when the amount of $Al_2O_3$ exceeds the above range, the seizure of $Al_2O_3$ may occur, and thus, the surface of the base steel sheet may not be smoothed. It is more preferable that MgO:$Al_2O_3$ which is the mass ratio of MgO and $Al_2O_3$ satisfies 3.5:6.5 to 6.5:3.5.

In a case where the bismuth chloride is included in the annealing separator, the glass film is easily removed from the steel sheet surface even when the glass film is formed in the final annealing. When the amount of the bismuth chloride is less than 0.5 mass % as compared with the total amount of MgO and $Al_2O_3$, the glass film may be remained. On the other hand, when the amount of the bismuth chloride is more than 15 mass % as compared with the total amount of MgO and $Al_2O_3$, the effect to suppress the seizure between the steel sheets may not be obtained as the annealing separator. The amount of the bismuth chloride is more preferably 3 mass % or more, and more preferably 7 mass % or less, as compared with the total amount of MgO and $Al_2O_3$.

The type of the bismuth chloride is not particularly limited, and known bismuth chloride may be adopted. For instance, bismuth oxychloride (BiOCl), bismuth trichloride ($BiCl_3$), and the like may be used. Moreover, compounds which can form the bismuth oxychloride by reaction in the annealing separator during the final annealing process may be used. For instance, as the compounds which can form the bismuth oxychloride during the final annealing, a mixture of bismuth compound and metal chloride may be used. For instance, as the bismuth compound, bismuth oxide, bismuth hydroxide, bismuth sulfide, bismuth sulfate, bismuth phosphate, bismuth carbonate, bismuth nitrate, organobismuth compound, bismuth halide, and the like may be used. For instance, as the metal chloride, iron chloride, cobalt chloride, nickel chloride, and the like may be used.

After applying the above annealing separator which does not form the forsterite film to the surface of the decarburization annealed steel sheet and drying the annealing separator, the final annealing is conducted. The annealing conditions in the final annealing process are not particularly limited, and known conditions may be adopted. For instance, the steel sheet may be held in the temperature range of 1100 to 1300° C. for 10 to 30 hours. Moreover, furnace atmosphere may be known nitrogen atmosphere or mixed atmosphere of nitrogen and hydrogen. After the final annealing, it is preferable that the redundant annealing separator is removed from the steel sheet surface by water-washing or pickling.

(Annealing Separator which forms Forsterite Film)

As the annealing separator which forms the glass film (forsterite film), the annealing separator which mainly includes MgO may be utilized. For instance, it is preferable that the annealing separator includes MgO of 60 mass % or more as percent solid.

After applying the annealing separator to the surface of the decarburization annealed steel sheet and drying the annealing separator, the final annealing is conducted. The annealing conditions in the final annealing process are not particularly limited, and known conditions may be adopted. For instance, the steel sheet may be held in the temperature range of 1100 to 1300° C. for 10 to 30 hours. Moreover, furnace atmosphere may be known nitrogen atmosphere or mixed atmosphere of nitrogen and hydrogen.

In a case where the annealing separator which forms the forsterite film is used, MgO in the annealing separator reacts with $SiO_2$ of the steel sheet surface during the final annealing, whereby the forsterite ($Mg_2SiO_4$) is formed. Thus, it is preferable that the forsterite film formed on the surface is removed by grinding or pickling the surface of the final annealed steel sheet after the final annealing. The method for removing the forsterite film from the surface of the final annealed steel sheet is not particularly limited, and known grinding or known pickling may be adopted.

For instance, in order to remove the forsterite film by pickling, the final annealed steel sheet may be immersed in hydrochloric acid of 20 to 40 mass % at 50 to 90° C. for 1 to 5 minutes, be water-washed, and then be dried. Moreover, the final annealed steel sheet may be pickled in mixed solution of fluorinated ammonium and sulfuric acid, be chemically polished in mixed solution of hydrofluoric acid and hydrogen peroxide solution, be water-washed, and then be dried.

<Oxidizing Process>

The oxidizing process (step S111) is the process of conducting the washing treatment, the pickling treatment, and the heat treatment in turn for the final annealed steel sheet after the final annealing process (final annealed steel sheet without the forsterite film) to obtain the oxidized steel sheet. Specifically, the surface of the final annealed steel sheet is washed as the washing treatment, the final annealed steel sheet is pickled using sulfuric acid of 5 to 20 mass % as the pickling treatment, and the final annealed steel sheet is held in the temperature range of 700 to 850° C. for 10 to 50 seconds in the atmosphere where the oxygen concentration is 5 to 21 volume % and the dew point is −10 to 30° C. as the heat treatment.

(Washing Treatment)

The surface of the final annealed steel sheet after the final annealing process is washed. The method for washing the surface of the final annealed steel sheet is not particularly limited, and known washing method may be adopted. For instance, the surface of the final annealed steel sheet may be water-washed.

(Pickling Treatment)

The final annealed steel sheet after the washing treatment is pickled using the sulfuric acid of 5 to 20 mass %. When the sulfuric acid is less than 5 mass %, the iron oxide layer satisfying the above formula 101 is not formed. Also, when the sulfuric acid is more than 20 mass %, the iron oxide layer satisfying the above formula 101 is not formed. The concentration of the sulfuric acid is preferably 6 mass % or more. The concentration of the sulfuric acid is preferably 15 mass % or less. Moreover, the temperature of the sulfuric acid used for pickling is not particularly limited, but may be 70° C. or more for instance.

The time for the pickling treatment is not particularly limited. For instance, the final annealed steel sheet may be passed at general line speed in the pickling bath where the above sulfuric acid is included.

(Heat Treatment)

The final annealed steel sheet after the pickling treatment is held in the temperature range of 700 to 850° C. for 10 to 50 seconds in the atmosphere where the oxygen concentration is 5 to 21 volume % and the dew point is −10 to 30° C. By the heat treatment, the surface of the final annealed steel sheet after the pickling treatment is oxidized, and thereby, the iron oxide layer is formed. The oxidized steel sheet after conducting the washing treatment, the pickling treatment, and the heat treatment satisfies the above formula 101.

When the oxygen concentration is less than 5%, when the dew point is less than −10° C., or when the holding temperature is less than 700° C., the iron oxide layer satisfying the above formula 101 is not formed. Also, when the oxygen concentration is more than 21% or when the dew point is more than 30° C., the iron oxide layer satisfying the above formula 101 is not formed. When the holding temperature is more than 850° C., the effect is saturated, and the heating cost increases.

When the holding time is less than 10 seconds, the iron oxide layer satisfying the above formula 101 is not formed. On the other hand, when the holding time is more than 50 seconds, the effect is saturated, and the heating cost increases.

The oxygen concentration is preferably 6 volume % or more, and is preferably 21 volume % or less. The dew point is preferably 0° C. or more, and is preferably 30° C. or less. The holding temperature is preferably 720° C. or more, and is preferably 850° C. or less. The holding time is preferably 15 seconds or more, and is preferably 50 seconds or less.

<Insulation Coating Forming Process>

The insulation coating forming process (step S113) is the process of applying the solution for forming the tension-insulation coating to the surface of the oxidized steel sheet after the oxidizing process and of baking the solution to obtain the grain oriented electrical steel sheet. In the insulation coating forming process, the tension-insulation coating may be formed on one sheet surface or both sheet surfaces of the oxidized steel sheet.

Before applying the solution, the surface of the oxidized steel sheet where the insulation coating is formed may be subjected to optional pretreatment such as degreasing treatment with alkaline, pickling treatment with hydrochloric acid, sulfuric acid, phosphoric acid, and the like. The pretreatment may not be conducted.

The conditions for forming the tension-insulation coating are not particularly limited, and known conditions may be adopted. Moreover, the tension-insulation coating may mainly include inorganics and may further include organics. For instance, the tension-insulation coating may mainly include at least one of metal chromate, metal phosphate, colloidal silica, Zr compound, Ti compound, and the like as the inorganics, and fine particles of organic resin may be dispersed in the tension-insulation coating. From the viewpoint of reducing the environmental loading during producing, the tension-insulation coating may be produced from starting material such as metal phosphate, coupling agents of Zr or Ti, carbonates thereof, ammonium salts thereof.

<Other Processes>

(Flattening Annealing Process)

Following the insulation coating forming process, the flattening annealing may be conducted for straightening. By conducting the flattening annealing for the grain oriented electrical steel sheet after the insulation coating forming process, it is possible to favorably reduce the iron loss characteristics.

(Magnetic Domain Refining Process)

The magnetic domain refining treatment may be conducted for the produced grain oriented electrical steel sheet. Herein, the magnetic domain refining treatment is the treatment such that the laser beam which refines the magnetic domain is irradiated to the surface of the grain oriented electrical steel sheet or the groove is formed on the surface of the grain oriented electrical steel sheet. By conducting the magnetic domain refining treatment, it is possible to favorably reduce the magnetic characteristics.

<Forming Method for Insulation Coating of Grain Oriented Electrical Steel Sheet>

Next, a forming method for the insulation coating of the grain oriented electrical steel sheet according to a preferred embodiment of the present invention is described. The forming method for the insulation coating of the grain oriented electrical steel sheet according to the embodiment includes the insulation coating forming process. In the insulation coating forming process, the solution for forming the tension-insulation coating is applied to a steel substrate, and the solution is baked, in order to form the tension-insulation.

The above steel substrate includes the base steel sheet and the oxide layer arranged in contact with the base steel sheet.

The base steel sheet includes, as the chemical composition, by mass %, 2.5 to 4.0% of Si,
0.05 to 1.0% of Mn,
0 to 0.01% of C,
0 to 0.005% of S+Se,
0 to 0.01% of sol.Al,
0 to 0.005% of N,
0 to 0.03% of Bi,
0 to 0.03% of Te,
0 to 0.03% of Pb,
0 to 0.50% of Sb,
0 to 0.50% of Sn,
0 to 0.50% of Cr,
0 to 1.0% of Cu, and
a balance consisting of Fe and impurities.

The oxide layer is the iron oxide layer. When the iron oxide layer is analyzed by the fourier transform infrared spectroscopy, when $A_{650}$ is the absorbance of the absorption peak detected at 650 $cm^{-1}$ in the infrared absorption spectrum, and when $A_{1250}$ is the absorbance of the absorption peak detected at 1250 $cm^{-1}$ in the infrared absorption spectrum, the $A_{650}$ and the $A_{1250}$ satisfy $0.2 \le A_{650}/A_{1250} \le 5.0$.

In the insulation coating forming process, the solution for forming the tension-insulation coating is applied to the iron oxide layer of the steel substrate, and the solution is baked.

It is preferable that the average thickness of the iron oxide layer is 200 to 500 nm.

The forming method for the insulation coating of the grain oriented electrical steel sheet according to the embodiment is substantially the same as the insulation coating forming process in the producing method for the grain oriented electrical steel sheet described above. For instance, the steel substrate in the forming method for the insulation coating of the grain oriented electrical steel sheet according to the embodiment corresponds to the oxidized steel sheet in the producing method for the grain oriented electrical steel sheet described above. Moreover, the steel substrate in the forming method for the insulation coating of the grain oriented electrical steel sheet according to the embodiment corresponds to the base steel sheet 11 and the iron oxide layer 13 shown in FIG. 1A and FIG. 1B of the grain oriented electrical steel sheet described above. Thus, the detail explanation for the forming method for the insulation coating of the grain oriented electrical steel sheet according to the embodiment is omitted.

EXAMPLES

Hereinafter, the effects of an aspect of the present invention are described in detail with reference to the following examples. However, the condition in the examples is an examples condition employed to confirm the operability and the effects of the present invention, so that the present invention is not limited to the example condition. The present invention can employ various types of conditions as long as the conditions do not depart from the scope of the present invention and can achieve the object of the present invention.

Example 1

A steel slab A (steel piece A) and a steel slab B (steel piece B) were heated to 1350° C., and then were hot-rolled to obtain the hot rolled steel sheets having the average thickness of 2.3 mm, herein the steel slab A including 0.082 mass % of C, 3.3 mass % of Si, 0.082 mass % of Mn, 0.023 mass % of S, 0.025 mass % of sol.Al, 0.008 mass % of N, and the balance consisting of Fe and impurities, and the steel slab B including. 0.081 mass % of C, 3.3 mass % of Si, 0.083 mass % of Mn, 0.022 mass % of S, 0.025 mass % of sol.Al, 0.008 mass % of N, 0.0025 mass % of Bi, and the balance consisting of Fe and impurities.

The obtained hot rolled steel sheets were annealed at 1100° C. for 120 seconds, and then were pickled. The steel sheets after pickling were cold-rolled to obtain the cold rolled steel sheets having the average thickness of 0.23 mm.

The obtained cold rolled steel sheets were decarburization-annealed. In the decarburization annealing, the cold rolled steel sheets were heated under the conditions such that the average heating rate S1 in the heating stage of 500° C. or more and less than 600° C. was 400° C./second and the average heating rate S2 in the heating stage of 600° C. or more and 700° C. or less was 1100° C./second (S2÷S1=2.75), and then were held at 850° C. for 120 seconds.

Subsequently, the annealing separator was applied and dried. In the annealing separator, MgO and $Al_2O_3$ of 95 mass % in total as percent solid were included, the mixing ratio of MgO and $Al_2O_3$ was 50%: 50% in mass % (1:1 as mass ratio), and BiOCl of 5 mass % as compared with the total amount of MgO and $Al_2O_3$ was included. Thereafter, the final annealing was conducted at 1200° C. for 20 hours.

The redundant annealing separator is removed by water-washing from the obtained final annealed steel sheet. In any steel sheets, the glass film (forsterite film) was not formed when confirmed by X-ray diffraction method.

The steel sheets after removing the redundant annealing separator by water-washing were subjected to the pickling treatment using the sulfuric acid whose temperature was 70° C. and whose concentration was shown in the following Table 1. Thereafter, the heat treatment was conducted by changing oxygen concentration, dew point, temperature, and time.

3.30% of Si, 0.083% Mn, 0.005% or less of S (0.005% or less of S+Se), 0.005% or less of sol.Al, 0.005% or less of N, 0.0001 mass % of Bi, and the balance consisting of Fe and impurities.

<Evaluation>

The fourier transform infrared spectroscopy, the average thickness of the iron oxide layer, the magnetic characteristics, and the adhesion of the tension-insulation coating were evaluated. The evaluation methods were as follows.

(Magnetic Characteristics)

The magnetic flux density B8 in the rolling direction (unit:T) (magnetic flux density in 800 A/m) and the iron loss W17/50 (unit:W/kg) (iron loss when excited to 1.7 T at 50 Hz) were evaluated on the basis of the method regulated by JIS C 2556:2015, using a single test piece with a length of 300 mm and a width of 60 mm. When the magnetic flux density B8 was 1.90 T or more, it was judged to as acceptable.

TABLE 1

| | | PRODUCTION CONDITIONS OXIDIZING PROCESS | | | | | | |
|---|---|---|---|---|---|---|---|---|
| | | PICKLING | | HEAT TREATMENT | | | | |
| No. | WASHING WASHING METHOD | CONCENTRATION OF SULFURIC ACID mass % | TEMPERATURE ° C. | OXYGEN CONCENTRATION volume % | DEW POINT ° C. | TEMPERATURE ° C. | TIME seconds |
| 1-1 | Water Washing | 5 | 70 | 20 | 10 | 800 | 5 |
| 1-2 | Water Washing | 5 | 70 | 20 | 10 | 800 | 15 |
| 1-3 | Water Washing | 5 | 70 | 20 | 10 | 800 | 40 |
| 1-4 | Water Washing | 15 | 70 | 20 | 10 | 680 | 20 |
| 1-5 | Water Washing | 15 | 70 | 20 | 10 | 800 | 20 |
| 1-6 | Water Washing | 15 | 70 | 20 | 10 | 840 | 20 |
| 1-7 | Water Washing | 3 | 70 | 20 | 10 | 720 | 15 |
| 1-8 | Water Washing | 15 | 70 | 20 | 10 | 800 | 30 |
| 1-9 | Water Washing | 15 | 70 | 27 | 10 | 800 | 30 |
| 1-10 | Water Washing | 15 | 70 | 20 | −15 | 800 | 30 |
| 1-11 | Water Washing | 15 | 70 | 1 | 10 | 800 | 30 |
| 1-12 | Water Washing | 15 | 70 | 20 | 35 | 800 | 30 |
| 1-13 | Water Washing | 25 | 70 | 20 | 10 | 680 | 20 |
| 1-14 | Water Washing | 5 | 70 | 20 | 10 | 800 | 5 |
| 1-15 | Water Washing | 5 | 70 | 20 | 10 | 800 | 15 |
| 1-16 | Water Washing | 5 | 70 | 20 | 10 | 800 | 40 |
| 1-17 | Water Washing | 15 | 70 | 20 | 10 | 680 | 20 |
| 1-18 | Water Washing | 15 | 70 | 20 | 10 | 800 | 20 |
| 1-19 | Water Washing | 15 | 70 | 20 | 10 | 840 | 20 |
| 1-20 | Water Washing | 3 | 70 | 20 | 10 | 720 | 15 |
| 1-21 | Water Washing | 15 | 70 | 20 | 10 | 800 | 30 |
| 1-22 | Water Washing | 15 | 70 | 25 | 10 | 800 | 30 |
| 1-23 | Water Washing | 15 | 70 | 20 | −15 | 800 | 30 |
| 1-24 | Water Washing | 15 | 70 | 1 | 10 | 800 | 30 |
| 1-25 | Water Washing | 15 | 70 | 20 | 35 | 800 | 30 |
| 1-26 | Water Washing | 25 | 70 | 20 | 10 | 680 | 20 |

The aqueous solution which mainly included aluminum phosphate and colloidal silica was applied to the steel sheets after the oxidizing process, the solution was baked at 850° C. for 1 minute, and thereby, the tension-insulation coating whose coating weight was 4.5 g/m$^2$ was formed on the surface of the test piece. The laser beam was irradiated on the test piece in order to refine the magnetic domain.

The base steel sheets of the grain oriented electrical steel sheets were chemically analyzed on the basis of the above method. The steel sheets made from the steel slab A included, as the chemical composition, by mass %, 0.002% or less of C, 3.30% of Si, 0.082% Mn, 0.005% or less of S (0.005% or less of S+Se), 0.005% or less of sol.Al, 0.005% or less of N, and the balance consisting of Fe and impurities. The steel sheets made from the steel slab B included, as the chemical composition, by mass %, 0.002% or less of C, (Fourier Transform Infrared Spectroscopy)

The steel sheet surface after oxidizing and before forming the tension-insulation coating was analyzed by the reflection absorption spectroscopy of the fourier transform infrared spectroscopy, using Frontier of PERKIN ELMER Frontier. Form the obtained infrared absorption spectrum, the absorbance ratio $A_{650}/A_{1250}$ was calculated on the basis of the above method. When the absorbance ratio $A_{650}/A_{1250}$ was 0.2 to 5.0, it was judged to as acceptable.

(Adhesion of Tension-Insulation Coating)

The test piece whose longitudinal direction corresponded to the rolling direction was taken from the obtained grain oriented electrical steel sheets, and the bend tests of bending diameter ϕ10 and bending diameter ϕ 20 were conducted using cylindrical mandrel bend tester. The surface of the test piece after the bend tests was observed, the fraction of the area where the insulation coating was remained without delamination in the area of the bended part (fraction of remained coating) was calculated, and thereby, the adhesion of the tension-insulation coating was evaluated. When the fraction of remained coating was grade A, it was judged to as acceptable.

Grade A: the fraction of remained coating is 90% or more.

Grade B: the fraction of remained coating is 70% or more and less than 90%.

Grade C: the fraction of remained coating is less than 70%.

(Average Thickness of Iron Oxide Layer)

The test piece for XPS was taken from the obtained grain oriented electrical steel sheets, and the average thickness of the iron oxide layer was measured on the basis of the above method.

The obtained results are summarized in the following Table 2.

TABLE 2

| No. | PRODUCTION RESULTS: FT-IR ABSORBANCE RATIO | PRODUCTION RESULTS: PRESENCE OR ABSENCE OF FORSTERITE | PRODUCTION RESULTS: THICKNESS OF IRON OXIDE LAYER nm | EVALUATION RESULTS: MAGNETIC CHARACTERISTICS $B_8$ T | EVALUATION RESULTS: MAGNETIC CHARACTERISTICS $W_{17/50}$ W/kg | EVALUATION RESULTS: ADHESION: FRACTION OF REMAINED COATING AFTER ϕ20 BENDING | EVALUATION RESULTS: ADHESION: FRACTION OF REMAINED COATING AFTER ϕ10 BENDING | REMARKS |
|---|---|---|---|---|---|---|---|---|
| 1-1 | 12.5 | Absence | 125 | 1.925 | 0.736 | C | C | COMPARATIVE EXAMPLE |
| 1-2 | 3.2 | Absence | 190 | 1.930 | 0.701 | A | A | INVENTIVE EXAMPLE |
| 1-3 | 2.5 | Absence | 355 | 1.931 | 0.702 | A | A | INVENTIVE EXAMPLE |
| 1-4 | 14.5 | Absence | 135 | 1.929 | 0.725 | C | C | COMPARATIVE EXAMPLE |
| 1-5 | 2.3 | Absence | 380 | 1.931 | 0.702 | A | A | INVENTIVE EXAMPLE |
| 1-6 | 2.1 | Absence | 260 | 1.932 | 0.702 | A | A | INVENTIVE EXAMPLE |
| 1-7 | 6.1 | Absence | 140 | 1.920 | 0.748 | B | B | COMPARATIVE EXAMPLE |
| 1-8 | 2.8 | Absence | 250 | 1.932 | 0.711 | A | A | INVENTIVE EXAMPLE |
| 1-9 | 6.1 | Absence | 145 | 1.915 | 0.762 | B | B | COMPARATIVE EXAMPLE |
| 1-10 | 9.5 | Absence | 125 | 1.921 | 0.746 | C | C | COMPARATIVE EXAMPLE |
| 1-11 | 0.1 | Absence | 105 | 1.921 | 0.748 | C | C | COMPARATIVE EXAMPLE |
| 1-12 | 6.2 | Absence | 130 | 1.922 | 0.744 | B | B | COMPARATIVE EXAMPLE |
| 1-13 | 8.5 | Absence | 160 | 1.921 | 0.746 | C | C | COMPARATIVE EXAMPLE |
| 1-14 | 12.3 | Absence | 150 | 1.951 | 0.679 | C | C | COMPARATIVE EXAMPLE |
| 1-15 | 3.3 | Absence | 190 | 1.970 | 0.631 | A | A | INVENTIVE EXAMPLE |
| 1-16 | 2.4 | Absence | 510 | 1.971 | 0.630 | A | A | INVENTIVE EXAMPLE |
| 1-17 | 14.2 | Absence | 160 | 1.956 | 0.651 | C | C | COMPARATIVE EXAMPLE |
| 1-18 | 2.5 | Absence | 400 | 1.971 | 0.632 | A | A | INVENTIVE EXAMPLE |
| 1-19 | 2.3 | Absence | 290 | 1.973 | 0.633 | A | A | INVENTIVE EXAMPLE |
| 1-20 | 6.4 | Absence | 130 | 1.953 | 0.662 | B | B | COMPARATIVE EXAMPLE |
| 1-21 | 2.6 | Absence | 330 | 1.973 | 0.631 | A | A | INVENTIVE EXAMPLE |
| 1-22 | 6.5 | Absence | 120 | 1.943 | 0.689 | B | B | COMPARATIVE EXAMPLE |
| 1-23 | 10.2 | Absence | 150 | 1.944 | 0.686 | C | C | COMPARATIVE EXAMPLE |
| 1-24 | 0.1 | Absence | 110 | 1.949 | 0.673 | C | C | COMPARATIVE EXAMPLE |
| 1-25 | 6.1 | Absence | 150 | 1.951 | 0.668 | B | B | COMPARATIVE EXAMPLE |
| 1-26 | 9.2 | Absence | 160 | 1.948 | 0.675 | C | C | COMPARATIVE EXAMPLE |

As clearly shown in the Tables 1 & 2, since the oxidizing conditions were satisfied in the test numbers 1-2, 1-3, 1-5, 1-6, 1-8, 1-15, 1-16, 1-18, 1-19, and 1-21, the absorbance ratio $A_{650}/A_{1250}$ was satisfied, and both magnetic characteristics and adhesion of the tension-insulation coating were excellent.

Moreover, since the chemical compositions of the steel slabs were favorable in the test numbers 1-15, 1-16, 1-18, 1-19, and 1-21 among the above test numbers, the magnetic characteristics were further excellent.

On the other hand, since the holding time for oxidizing was shorter in the test number 1-1 and the holding temperature for oxidizing was lower in the test number 1-4, the absorbance ratio $A_{650}/A_{1250}$ was not satisfied, and the adhesion of the tension-insulation coating was inferior.

Since the concentration of sulfuric acid was lower in the test number 1-7 and the oxygen concentration for oxidizing was higher in the test number 1-9, the adhesion of the tension-insulation coating was inferior.

Since the dew point for oxidizing was lower in the test number 1-23 and the oxygen concentration for oxidizing was lower in the test number 1-24, the adhesion of the tension-insulation coating was inferior.

Since the dew point for oxidizing was higher in the test number 1-25, the adhesion of the tension-insulation coating was inferior.

Since the concentration for pickling was higher and the temperature for oxidizing was lower in the test number 1-26, the adhesion of the tension-insulation coating was inferior.

Example 2

Steel slabs (steel pieces) with chemical compositions shown in the following Table 3 were heated to 1380° C., and then were hot-rolled to obtain the hot rolled steel sheets having the average thickness of 2.3 mm. Some steels were cracked, and thus could not be subjected to subsequent processes.

TABLE 3

| STEEL | PRODUCTION CONDITIONS CHEMICAL COMPOSITION OF SLAB (STEEL PIECE) (UNIT: mass %, BALANCE CONSISTING OF Fe AND IMPURITIES) | | | | | | | | | | |
|---|---|---|---|---|---|---|---|---|---|---|---|
| TYPE | C | Si | Mn | S | Se | S + Se | sol. Al | N | Bi | Te | Pb |
| A-1 | 0.079 | 3.31 | 0.080 | 0.022 | 0.001 | 0.023 | 0.025 | 0.008 | | | |
| A-2 | 0.078 | 3.51 | 0.077 | 0.002 | 0.051 | 0.053 | 0.024 | 0.008 | | | |
| A-3 | 0.082 | 3.31 | 0.080 | 0.001 | 0.023 | 0.024 | 0.025 | 0.008 | 0.0025 | | |
| A-4 | 0.082 | 3.31 | 0.080 | 0.020 | 0.006 | 0.026 | 0.025 | 0.008 | 0.0025 | | |
| A-5 | 0.081 | 3.22 | 0.075 | 0.021 | 0.002 | 0.023 | 0.025 | 0.009 | | 0.0015 | |
| A-6 | 0.080 | 3.32 | 0.080 | 0.019 | 0.003 | 0.022 | 0.026 | 0.008 | | | 0.0015 |
| A-7 | 0.079 | 3.31 | 0.080 | 0.022 | 0.001 | 0.023 | 0.025 | 0.009 | 0.0026 | 0.0005 | |
| A-8 | 0.078 | 3.51 | 0.077 | 0.001 | 0.018 | 0.019 | 0.024 | 0.008 | | 0.0018 | 0.0011 |
| A-9 | 0.079 | 3.22 | 0.080 | 0.019 | 0.003 | 0.022 | 0.025 | 0.009 | 0.0021 | | 0.0015 |
| A-10 | 0.080 | 3.31 | 0.080 | 0.001 | 0.022 | 0.023 | 0.025 | 0.008 | 0.0018 | 0.0018 | 0.0018 |
| A-11 | 0.085 | 3.31 | 0.080 | 0.022 | 0.001 | 0.023 | 0.025 | 0.008 | 0.0141 | 0.0018 | 0.0012 |
| A-12 | 0.071 | 4.05 | 0.081 | 0.019 | 0.051 | 0.070 | 0.025 | 0.008 | | | |
| A-13 | 0.071 | 2.41 | 0.081 | 0.019 | 0.001 | 0.020 | 0.025 | 0.008 | | | |
| A-14 | 0.008 | 3.28 | 0.075 | 0.022 | 0.006 | 0.028 | 0.021 | 0.008 | | | |
| A-15 | 0.209 | 3.15 | 0.051 | 0.021 | 0.006 | 0.027 | 0.031 | 0.006 | | | |
| A-16 | 0.061 | 3.31 | 0.081 | 0.012 | 0.003 | 0.015 | 0.009 | 0.009 | | | |
| A-17 | 0.061 | 3.29 | 0.082 | 0.015 | 0.003 | 0.018 | 0.075 | 0.009 | | | |
| A-18 | 0.072 | 3.I9 | 0.008 | 0.051 | 0.001 | 0.052 | 0.018 | 0.008 | | | |
| A-19 | 0.073 | 3.18 | 1.010 | 0.051 | 0.001 | 0.052 | 0.015 | 0.009 | | | |
| A-20 | 0.071 | 3.25 | 0.081 | 0.003 | 0.001 | 0.004 | 0.025 | 0.008 | | | |
| A-21 | 0.071 | 3.19 | 0.051 | 0.095 | 0.001 | 0.096 | 0.019 | 0.008 | | | |
| A-22 | 0.085 | 3.31 | 0.082 | 0.052 | 0.002 | 0.054 | 0.023 | 0.023 | | | |
| A-23 | 0.085 | 3.31 | 0.052 | 0.052 | 0.002 | 0.054 | 0.023 | 0.002 | | | |

Since the dew point for oxidizing was lower in the test number 1-10 and the oxygen concentration for oxidizing was lower in the test number 1-11, the adhesion of the tension-insulation coating was inferior.

Since the dew point for oxidizing was higher in the test number 1-12, the adhesion of the tension-insulation coating was inferior.

Since the concentration for pickling was higher and the temperature for oxidizing was lower in the test number 1-13, the adhesion of the tension-insulation coating was inferior.

Since the holding time for oxidizing was shorter in the test number 1-14 and the holding temperature for oxidizing was lower in the test number 1-17, the absorbance ratio $A_{650}/A_{1250}$ was not satisfied, and the adhesion of the tension-insulation coating was inferior.

Since the concentration of sulfuric acid was lower in the test number 1-20 and the oxygen concentration for oxidizing was higher in the test number 1-22, the adhesion of the tension-insulation coating was inferior.

The hot rolled steel sheets which could be subjected to subsequent processes were annealed at 1120° C. for 120 seconds, and then were pickled. The steel sheets after pickling were cold-rolled to obtain the cold rolled steel sheets having the average thickness of 0.23 mm. Some steels were cracked during cold rolling, and thus could not be subjected to subsequent processes.

The steel sheets which could be subjected to subsequent processes were decarburization-annealed. In the decarburization annealing, the cold rolled steel sheets were heated under the conditions such that the average heating rate S1 in the heating stage of 500° C. or more and less than 600° C. was 900° C./second and the average heating rate S2 in the heating stage of 600° C. or more and 700° C. or less was 1600° C./second (S2÷S1=1.78), and then were held at 850° C. for 150 seconds.

Subsequently, the annealing separator was applied and dried. In the annealing separator, MgO and $Al_2O_3$ of 94 mass % in total as percent solid were included, the mixing ratio of MgO and $Al_2O_3$ was 50%:50% in mass % (1:1 as mass ratio), and BiOCl of 6 mass % as compared with the total amount of MgO and $Al_2O_3$ was included. Thereafter, the final annealing was conducted at 1200° C. for 20 hours.

The redundant annealing separator is removed by water-washing from the obtained final annealed steel sheet. In any steel sheets, the glass film (forsterite film) was not formed when confirmed by X-ray diffraction method.

The steel sheets after removing the redundant annealing separator by water-washing were subjected to the pickling treatment using the sulfuric acid whose temperature was 70° C. and whose concentration was 10%. Thereafter, the heat treatment was conducted by holding under conditions such as 21% of the oxygen concentration, 10° C. of the dew point, 800° C. of the temperature, and 20 seconds of time. Herein, in the test number 2-24 shown below, the heat treatment was not conducted, and the test number 2-24 was as pickled.

Subsequently, the aqueous solution which mainly included aluminum phosphate and colloidal silica was applied, the solution was baked at 850° C. for 1 minute, and thereby, the tension-insulation coating whose coating weight was 4.5 $g/m^2$ was formed on the surface of the test piece.

The base steel sheets of the grain oriented electrical steel sheets were chemically analyzed on the basis of the above method. The chemical compositions are shown in Table 4. In regard to Table 3 and Table 4, the element whose value is blanc in the tables indicates the element in which the purposeful control is not conducted for the amount thereof during production.

<Evaluation>

The fourier transform infrared spectroscopy, the average thickness of the iron oxide layer, the magnetic characteristics, and the adhesion of the tension-insulation coating were evaluated. The evaluation methods for the fourier transform infrared spectroscopy, the average thickness of the iron oxide layer, and the adhesion of the tension-insulation coating were the same as those in the above Example 1. The magnetic characteristics were evaluated as follows.

(Magnetic Characteristics) The magnetic characteristics in the rolling direction were evaluated on the basis of the method regulated by JIS C 2556:2015, using the single test piece with the length of 300 mm and the width of 60 mm. When the magnetic flux density B8 was 1.90 T or more, it was judged to as acceptable. For the steel sheets whose magnetic flux density B8 was acceptable, the laser beam was irradiated in order to refine the magnetic domain. The iron loss W17/50 of the steel sheets for which the laser beam was irradiated was evaluated.

The obtained results are summarized in the following Table 5.

TABLE 4

| | | PRODUCTION RESULTS CHEMICAL COMPOSITION OF BASE STEEL SHEET OF GRAIN ORIENTED ELECTRICAL STEEL SHEET (UNIT: mass %, BALANCE CONSISTING OF Fe AND IMPURITIES) | | | | | | | | | | |
|---|---|---|---|---|---|---|---|---|---|---|---|---|
| No. | STEEL TYPE | C | Si | Mn | S | Se | S + Se | sol. Al | N | Bi | Te | Pb |
| 2-1 | A-1 | ≤0.002 | 3.31 | 0.080 | ≤0.005 | ≤0.001 | ≤0.005 | ≤0.005 | ≤0.005 | | | |
| 2-2 | A-2 | ≤0.002 | 3.51 | 0.077 | ≤0.005 | ≤0.001 | ≤0.005 | ≤0.005 | ≤0.005 | | | |
| 2-3 | A-3 | ≤0.002 | 3.31 | 0.080 | ≤0.005 | ≤0.001 | ≤0.005 | ≤0.005 | ≤0.005 | 0.0001 | | |
| 2-4 | A-4 | ≤0.002 | 3.31 | 0.080 | ≤0.005 | ≤0.001 | ≤0.005 | ≤0.005 | ≤0.005 | 0.0001 | | |
| 2-5 | A-5 | ≤0.002 | 3.22 | 0.075 | ≤0.005 | ≤0.001 | ≤0.005 | ≤0.005 | ≤0.005 | | 0.0001 | |
| 2-6 | A-6 | ≤0.002 | 3.32 | 0.080 | ≤0.005 | ≤0.001 | ≤0.005 | ≤0.005 | ≤0.005 | | | 0.0015 |
| 2-7 | A-7 | ≤0.002 | 3.31 | 0.080 | ≤0.005 | ≤0.001 | ≤0.005 | ≤0.005 | ≤0.005 | 0.0001 | 0.0001 | |
| 2-8 | A-8 | ≤0.002 | 3.51 | 0.077 | ≤0.005 | ≤0.001 | ≤0.005 | ≤0.005 | ≤0.005 | | 0.0001 | 0.0011 |
| 2-9 | A-9 | ≤0.002 | 3.22 | 0.080 | ≤0.005 | ≤0.001 | ≤0.005 | ≤0.005 | ≤0.005 | 0.0001 | | 0.0015 |
| 2-10 | A-10 | ≤0.002 | 3.31 | 0.080 | ≤0.005 | ≤0.001 | ≤0.005 | ≤0.005 | ≤0.005 | 0.0001 | 0.0001 | 0.0018 |
| 2-11 | A-11 | ≤0.002 | 3.31 | 0.080 | ≤0.005 | ≤0.001 | ≤0.005 | ≤0.005 | ≤0.005 | 0.0001 | 0.0001 | 0.0012 |
| 2-12 | A-12 | — | — | — | — | — | — | — | — | — | — | — |
| 2-13 | A-13 | ≤0.002 | 2.41 | 0.081 | ≤0.005 | ≤0.001 | ≤0.005 | ≤0.005 | ≤0.005 | | | |
| 2-14 | A-14 | ≤0.002 | 3.28 | 0.075 | ≤0.005 | ≤0.001 | ≤0.005 | ≤0.005 | ≤0.005 | | | |
| 2-15 | A-15 | ≤0.002 | 3.15 | 0.051 | ≤0.005 | ≤0.001 | ≤0.005 | ≤0.005 | ≤0.005 | | | |
| 2-16 | A-16 | ≤0.002 | 3.31 | 0.081 | ≤0.005 | ≤0.001 | ≤0.005 | ≤0.005 | ≤0.005 | | | |
| 2-17 | A-17 | — | — | — | — | — | — | — | — | — | — | — |
| 2-18 | A-18 | ≤0.002 | 3.19 | 0.008 | ≤0.005 | ≤0.001 | ≤0.005 | ≤0.005 | ≤0.005 | | | |
| 2-19 | A-19 | ≤0.002 | 3.18 | 1.010 | ≤0.005 | ≤0.001 | ≤0.005 | ≤0.005 | ≤0.005 | | | |
| 2-20 | A-20 | ≤0.002 | 3.25 | 0.081 | ≤0.005 | ≤0.001 | ≤0.005 | ≤0.005 | ≤0.005 | | | |
| 2-21 | A-21 | — | — | — | — | — | — | — | — | — | — | — |
| 2-22 | A-22 | — | — | — | — | — | — | — | — | — | — | — |
| 2-23 | A-23 | ≤0.002 | 3.31 | 0.052 | ≤0.005 | ≤0.001 | ≤0.005 | ≤0.005 | ≤0.005 | | | |
| 2-24 | A-1 | ≤0.002 | 3.31 | 0.080 | ≤0.005 | ≤0.001 | ≤0.005 | ≤0.005 | ≤0.005 | | | |

TABLE 5

| | | PRODUCTION RESULTS | | | EVALUATION RESULTS | | | | |
|---|---|---|---|---|---|---|---|---|---|
| | | | | | MAGNETIC CHARACTERISTICS | | ADHESION | | |
| No. | STEEL TYPE | FT-IR ABSORBANCE RATIO | PRESENCE OR ABSENCE OF FORSTERITE | THICKNESS OF IRON OXIDE LAYER nm | $B_8$ T | $W_{17/50}$ W/kg | FRACTION OF REMAINED COATING AFTER φ20 BENDING | FRACTION OF REMAINED COATING AFTER φ10 BENDING | REMARKS |
| 2-1 | A-1 | 1.8 | Absence | 310 | 1.944 | 0.704 | A | A | INVENTIVE EXAMPLE |
| 2-2 | A-2 | 1.7 | Absence | 305 | 1.946 | 0.705 | A | A | INVENTIVE EXAMPLE |
| 2-3 | A-3 | 1.8 | Absence | 330 | 1.985 | 0.621 | A | A | INVENTIVE EXAMPLE |
| 2-4 | A-4 | 1.6 | Absence | 320 | 1.985 | 0.625 | A | A | INVENTIVE EXAMPLE |
| 2-5 | A-5 | 1.8 | Absence | 340 | 1.985 | 0.625 | A | A | INVENTIVE EXAMPLE |
| 2-6 | A-6 | 1.9 | Absence | 350 | 1.981 | 0.631 | A | A | INVENTIVE EXAMPLE |
| 2-7 | A-7 | 1.7 | Absence | 380 | 1.982 | 0.632 | A | A | INVENTIVE EXAMPLE |
| 2-8 | A-8 | 1.8 | Absence | 305 | 1.982 | 0.631 | A | A | INVENTIVE EXAMPLE |
| 2-9 | A-9 | 1.8 | Absence | 360 | 1.986 | 0.618 | A | A | INVENTIVE EXAMPLE |
| 2-10 | A-10 | 1.8 | Absence | 370 | 1.987 | 0.613 | A | A | INVENTIVE EXAMPLE |
| 2-11 | A-11 | 1.8 | Absence | 350 | 1.988 | 0.611 | A | A | INVENTIVE EXAMPLE |
| 2-12 | A-12 | — | — | — | — | — | — | — | COMPARATIVE EXAMPLE |
| 2-13 | A-13 | 1.7 | Absence | 360 | 1.681 | — | A | A | COMPARATIVE EXAMPLE |
| 2-14 | A-14 | 1.6 | Absence | 370 | 1.661 | — | A | A | COMPARATIVE EXAMPLE |
| 2-15 | A-15 | 1.5 | Absence | 350 | 1.721 | — | A | A | COMPARATIVE EXAMPLE |
| 2-16 | A-16 | 1.5 | Absence | 330 | 1.691 | — | A | A | COMPARATIVE EXAMPLE |
| 2-17 | A-17 | — | — | — | — | — | — | — | COMPARATIVE EXAMPLE |
| 2-18 | A-18 | 1.6 | Absence | 340 | 1.722 | — | A | A | COMPARATIVE EXAMPLE |
| 2-19 | A-19 | 1.7 | Absence | 320 | 1.701 | — | A | A | COMPARATIVE EXAMPLE |
| 2-20 | A-20 | 1.8 | Absence | 350 | 1.725 | — | A | A | COMPARATIVE EXAMPLE |
| 2-21 | A-21 | — | — | — | — | — | — | — | COMPARATIVE EXAMPLE |
| 2-22 | A-22 | — | — | — | — | — | — | — | COMPARATIVE EXAMPLE |
| 2-23 | A-23 | 1.8 | Absence | 305 | 1.741 | — | A | A | COMPARATIVE EXAMPLE |
| 2-24 | A-1 | 0.1 | Absence | 20 | 1.941 | 0.711 | C | C | COMPARATIVE EXAMPLE |

As clearly shown in the Tables 3 to 5, since the chemical compositions of the base steel sheets were satisfied in the test numbers 2-1 to 2-11, the absorbance ratio $A_{650}/A_{1250}$ was satisfied, and both magnetic characteristics and adhesion of the tension-insulation coating were excellent.

Moreover, since the chemical compositions of the steel slabs were favorable in the test numbers 2-3 to 2-11 among the above test numbers, the magnetic characteristics were further excellent.

On the other hand, since the Si content was excessive in the test number 2-12, the steel sheet was fractured during cold rolling.

Since the Si content was insufficient in the test number 2-13, the magnetic characteristics were inferior.

Since the C content was insufficient in the test number 2-14 and the C content was excessive in the test number 2-15, the magnetic characteristics were inferior.

Since the sol.Al content was insufficient in the test number 2-16, the magnetic characteristics were inferior.

Since the sol.Al content was excessive in the test number 2-17, the steel sheet was fractured during cold rolling.

Since the Mn content was insufficient in the test number 2-18 and the Mn content was excessive in the test number 2-19, the magnetic characteristics were inferior.

Since the total amount of S and Se was insufficient in the test number 2-20, the magnetic characteristics were inferior.

Since the total amount of S and Se was excessive in the test number 2-21, the steel sheet was fractured during hot rolling.

Since the N content was excessive in the test number 2-22, the steel sheet was fractured during cold rolling.

Since the N content was insufficient in the test number 2-23, the magnetic characteristics were inferior.

Since the heat treatment in the oxidizing process was not conducted in the test number 2-24, the adhesion of the tension-insulation coating was inferior. In the test number 2-24, the coating just after being baked had been delaminated even in the frat part except for the bended part in addition to the bended part.

Example 3

Steel slabs (steel pieces) with chemical compositions shown in the following Table 6 were heated to 1380° C., and then were hot-rolled to obtain the hot rolled steel sheets having the average thickness of 2.3 mm.

TABLE 6

| STEEL | PRODUCTION CONDITIONS CHEMICAL COMPOSITION OF SLAB (STEEL PIECE) (UNIT: mass %, BALANCE CONSISTING OF Fe AND IMPURITIES) | | | | | | | | | |
|---|---|---|---|---|---|---|---|---|---|---|
| TYPE | C | Si | Mn | S | S + Se | sol. Al | N | Bi | Te | Pb |
| B-1 | 0.079 | 3.34 | 0.080 | 0.022 | 0.022 | 0.025 | 0.008 | | | |
| B-2 | 0.079 | 3.32 | 0.080 | 0.022 | 0.022 | 0.025 | 0.008 | 0.0015 | | |
| B-3 | 0.078 | 3.31 | 0.081 | 0.023 | 0.023 | 0.024 | 0.008 | | 0.002 | |
| B-4 | 0.078 | 3.34 | 0.082 | 0.022 | 0.022 | 0.025 | 0.008 | | | 0.001 |
| B-5 | 0.078 | 3.34 | 0.081 | 0.021 | 0.021 | 0.025 | 0.008 | 0.0012 | | 0.001 |
| B-6 | 0.079 | 3.31 | 0.082 | 0.022 | 0.022 | 0.025 | 0.008 | | 0.002 | 0.002 |
| B-7 | 0.078 | 3.32 | 0.082 | 0.023 | 0.023 | 0.025 | 0.008 | 0.0012 | 0.001 | 0.002 |

The hot rolled steel sheets were annealed at 1120° C. for 120 seconds, and then were pickled. The steel sheets after pickling were cold-rolled to obtain the cold rolled steel sheets having the average thickness of 0.23 mm.

The obtained cold rolled steel sheets were decarburization-annealed. In the decarburization annealing, the cold rolled steel sheets were heated by changing the average heating rate S1 (° C./second) in the heating stage of 500° C. or more and less than 600° C. and the average heating rate S2 (° C./second) in the heating stage of 600° C. or more and 700° C. or less as shown in the following Table 7, and then were held at 850° C. for 150 seconds.

TABLE 7

| | | PRODUCTION CONDITIONS DECARBURIZATION ANNEALING | | | | |
|---|---|---|---|---|---|---|
| No. | STEEL TYPE | S1 ° C./seconds | S2 ° C./seconds | S2/S1 | TEMPERATURE ° C. | TIME seconds |
| 3-1 | B-1 | 280 | 950 | 3.39 | 850 | 150 |
| 3-2 | B-1 | 400 | 950 | 2.38 | 850 | 150 |
| 3-3 | B-1 | 280 | 1600 | 5.71 | 850 | 150 |
| 3-4 | B-2 | 280 | 950 | 3.39 | 850 | 150 |
| 3-5 | B-2 | 400 | 950 | 2.38 | 850 | 150 |
| 3-6 | B-2 | 400 | 2000 | 5.00 | 850 | 150 |
| 3-7 | B-2 | 700 | 2000 | 2.86 | 850 | 150 |
| 3-8 | B-3 | 700 | 2000 | 2.86 | 850 | 150 |
| 3-9 | B-4 | 700 | 1600 | 2.29 | 850 | 150 |
| 3-10 | B-5 | 700 | 1600 | 2.29 | 850 | 150 |
| 3-11 | B-6 | 700 | 1600 | 2.29 | 850 | 150 |
| 3-12 | B-7 | 700 | 1600 | 2.29 | 850 | 150 |
| 3-13 | B-1 | 280 | 950 | 3.39 | 850 | 150 |
| 3-14 | B-1 | 400 | 950 | 2.38 | 850 | 150 |
| 3-15 | B-1 | 280 | 1600 | 5.71 | 850 | 150 |
| 3-16 | B-1 | 600 | 350 | 0.58 | 850 | 150 |

Subsequently, the annealing separator was applied and dried. In the annealing separator, MgO and $Al_2O_3$ of 94 mass % in total as percent solid were included, the mixing ratio of MgO and $Al_2O_3$ was 50%:50% in mass % (1:1 as mass ratio), and BiOCl of 6 mass % as compared with the total amount of MgO and $Al_2O_3$ was included. Thereafter, the final annealing was conducted at 1200° C. for 20 hours.

The redundant annealing separator is removed by water-washing from the obtained final annealed steel sheet. In any steel sheets, the glass film (forsterite film) was not formed when confirmed by X-ray diffraction method.

The steel sheets after removing the redundant annealing separator by water-washing were subjected to the pickling treatment using the sulfuric acid whose temperature was 85° C. and whose concentration was 8%. Thereafter, for the test numbers 3-1 to 3-12 and 3-16, the heat treatment was conducted by holding under conditions such as 21% of the oxygen concentration, 10° C. of the dew point, 800° C. of the temperature, and 30 seconds of time. Moreover, for the test number 3-13, the heat treatment was conducted by holding under conditions such as 1% of the oxygen concentration, 10° C. of the dew point, 700° C. of the temperature, and 5 seconds of time. Moreover, for the test numbers 3-14 and 3-15, the heat treatment was conducted by holding under conditions such as 21% of the oxygen concentration, 10° C. of the dew point, 650° C. of the temperature, and 5 seconds of time.

The aqueous solution which mainly included aluminum phosphate and colloidal silica was applied to the steel sheets after the oxidizing process, the solution was baked at 850° C. for 1 minute, and thereby, the tension-insulation coating whose coating weight was 4.5 $g/m^2$ was formed on the surface of the test piece. The laser beam was irradiated on the test piece in order to refine the magnetic domain.

The base steel sheets of the grain oriented electrical steel sheets were chemically analyzed on the basis of the above method. Any steel sheets included, as the chemical composition, by mass %, 0.002% or less of C, 0.005% or less of S (0.005% or less of S+Se), 0.005% or less of sol.Al, and 0.005% or less of N. Moreover, the Si content, the Mn content, and the Pb content of any steel sheets were the same as those of the steel slabs (steel pieces). Moreover, in any steel sheets including Bi or Te, the Bi content was 0.0001% and the Te content was 0.0001%. Moreover, in any steel sheets, the balance of the above elements consisted of Fe and impurities.

<Evaluation>

The fourier transform infrared spectroscopy, the average thickness of the iron oxide layer, the magnetic characteristics, and the adhesion of the tension-insulation coating were evaluated. The evaluation methods were the same as those in the above Example 1.

The obtained results are summarized in the following Table 8.

TABLE 8

| | | PRODUCTION RESULTS | | | EVALUATION RESULTS | | | | |
|---|---|---|---|---|---|---|---|---|---|
| | | | | | MAGNETIC CHARACTERISTICS | | ADHESION | | |
| No. | STEEL TYPE | FT-IR ABSORBANCE RATIO | PRESENCE OR ABSENCE OF FORSTERITE | THICKNESS OF IRON OXIDE LAYER nm | $B_8$ T | $W_{17/50}$ W/kg | FRACTION OF REMAINED COATING AFTER ϕ20 BENDING | FRACTION OF REMAINED COATING AFTER ϕ10 BENDING | REMARKS |
| 3-1 | B-1 | 1.8 | Absence | 350 | 1.925 | 0.718 | A | A | INVENTIVE EXAMPLE |
| 3-2 | B-1 | 1.7 | Absence | 340 | 1.928 | 0.729 | A | A | INVENTIVE EXAMPLE |
| 3-3 | B-1 | 1.6 | Absence | 330 | 1.935 | 0.705 | A | A | INVENTIVE EXAMPLE |
| 3-4 | B-2 | 1.5 | Absence | 320 | 1.958 | 0.639 | A | A | INVENTIVE EXAMPLE |
| 3-5 | B-2 | 1.8 | Absence | 310 | 1.956 | 0.642 | A | A | INVENTIVE EXAMPLE |
| 3-6 | B-2 | 1.7 | Absence | 330 | 1.978 | 0.605 | A | A | INVENTIVE EXAMPLE |
| 3-7 | B-2 | 1.9 | Absence | 350 | 1.978 | 0.601 | A | A | INVENTIVE EXAMPLE |
| 3-8 | B-3 | 2.1 | Absence | 290 | 1.978 | 0.601 | A | A | INVENTIVE EXAMPLE |
| 3-9 | B-4 | 1.8 | Absence | 280 | 1.977 | 0.607 | A | A | INVENTIVE EXAMPLE |
| 3-10 | B-5 | 1.9 | Absence | 290 | 1.976 | 0.611 | A | A | INVENTIVE EXAMPLE |
| 3-11 | B-6 | 1.7 | Absence | 330 | 1.977 | 0.609 | A | A | INVENTIVE EXAMPLE |
| 3-12 | B-7 | 1.6 | Absence | 320 | 1.976 | 0.605 | A | A | INVENTIVE EXAMPLE |
| 3-13 | B-1 | 0.1 | Absence | 110 | 1.911 | 0.745 | C | C | COMPARATIVE EXAMPLE |
| 3-14 | B-1 | 16.5 | Absence | 120 | 1.915 | 0.751 | C | C | COMPARATIVE EXAMPLE |

TABLE 8-continued

| | | PRODUCTION RESULTS | | | EVALUATION RESULTS | | | | |
|---|---|---|---|---|---|---|---|---|---|
| | | | | | | | ADHESION | | |
| | | FT-IR | PRESENCE OR ABSENCE | THICKNESS OF IRON OXIDE | MAGNETIC CHARACTERISTICS | | FRACTION OF REMAINED COATING AFTER | FRACTION OF REMAINED COATING AFTER | |
| No. | STEEL TYPE | ABSORBANCE RATIO | OF FORSTERITE | LAYER nm | $B_8$ T | $W_{17/50}$ W/kg | ϕ20 BENDING | ϕ10 BENDING | REMARKS |
| 3-15 | B-1 | 15.1 | Absence | 130 | 1.921 | 0.738 | C | C | COMPARATIVE EXAMPLE |
| 3-16 | B-1 | 1.6 | Absence | 330 | 1.922 | 0.731 | A | A | INVENTIVE EXAMPLE |

As clearly shown in the Tables 6 to 8, since the chemical compositions of the base steel sheets were satisfied and the production conditions were satisfied in the test numbers 3-1 to 3-12 and 3-16, both magnetic characteristics and adhesion of the tension-insulation coating were excellent.

Moreover, since the oxidizing conditions were favorable in the test numbers 3-1 to 3-3 among the above test numbers although the steel number and the heating rate of the decarburization annealing in the test numbers 3-1 to 3-3 were the same as those in the test numbers 3-13 to 3-15, both magnetic characteristics and adhesion of the tension-insulation coating were excellent as compared with those in the test numbers 3-13 to 3-15.

Moreover, since the chemical compositions of the steel slabs were favorable in the test numbers 3-4 to 3-12 among the above test numbers, the magnetic characteristics were further excellent.

In particular, since the average heating rate S1 and the average heating rate S2 in the heating stage of the decarburization annealing were favorable in addition to the steel slabs having the favorable chemical compositions in the test numbers 3-6 to 3-12 among the above test numbers, the magnetic characteristics were further excellent.

On the other hand, since the conditions for the oxidizing process were not favorable in the test numbers 3-13 to 3-15, the adhesion of the tension-insulation coating was inferior. The coating thereof had been delaminated before conducting the bend test.

Example 4

Steel slabs (steel pieces) with chemical compositions shown in the following Table 9 were heated to 1350° C., and then were hot-rolled to obtain the hot rolled steel sheets having the average thickness of 2.3 mm.

TABLE 9

| STEEL | PRODUCTION CONDITIONS CHEMICAL COMPOSITION OF SLAB (STEEL PIECE) (UNIT: mass %, BALANCE CONSISTING OF Fe AND IMPURITIES) | | | | | | | | | | | |
|---|---|---|---|---|---|---|---|---|---|---|---|---|
| TYPE | C | Si | Mn | S | S + Se | sol. Al | N | Bi | Sb | Sn | Cr | Cu |
| C-1 | 0.081 | 3.35 | 0.081 | 0.022 | 0.022 | 0.025 | 0.008 | | | | | |
| C-2 | 0.083 | 3.25 | 0.082 | 0.023 | 0.023 | 0.025 | 0.008 | 0.0031 | | | | |
| C-3 | 0.082 | 3.30 | 0.082 | 0.023 | 0.023 | 0.025 | 0.008 | | | | | |
| C-4 | 0.081 | 3.30 | 0.083 | 0.022 | 0.022 | 0.025 | 0.008 | 0.0025 | | | | |
| C-5 | 0.082 | 3.30 | 0.082 | 0.023 | 0.023 | 0.025 | 0.008 | | 0.021 | | | |
| C-6 | 0.081 | 3.30 | 0.083 | 0.022 | 0.022 | 0.025 | 0.008 | 0.0025 | | 0.031 | | |
| C-7 | 0.082 | 3.30 | 0.082 | 0.023 | 0.023 | 0.025 | 0.008 | | | | 0.052 | |
| C-8 | 0.081 | 3.30 | 0.083 | 0.022 | 0.022 | 0.025 | 0.008 | 0.0025 | | | | 0.051 |
| C-9 | 0.082 | 3.30 | 0.082 | 0.023 | 0.023 | 0.025 | 0.008 | | 0.021 | | | |
| C-10 | 0.081 | 3.30 | 0.083 | 0.022 | 0.022 | 0.025 | 0.008 | 0.0025 | | 0.031 | | |
| C-11 | 0.082 | 3.30 | 0.082 | 0.023 | 0.023 | 0.025 | 0.008 | | | | 0.052 | |
| C-12 | 0.081 | 3.30 | 0.083 | 0.022 | 0.022 | 0.025 | 0.008 | 0.0025 | | | | 0.051 |

The obtained hot rolled steel sheets were annealed at 1100° C. for 120 seconds, and then were pickled. The steel sheets after pickling were cold-rolled to obtain the cold rolled steel sheets having the average thickness of 0.23 mm.

The obtained cold rolled steel sheets were decarburization-annealed. In the decarburization annealing, the cold rolled steel sheets were heated under the conditions such that the average heating rate S1 in the heating stage of 500° C. or more and less than 600° C. was 400° C./second and the average heating rate S2 in the heating stage of 600° C. or more and 700° C. or less was 1100° C./second (S2÷S1=2.75), and then were held at 850° C. for 120 seconds.

Subsequently, the final annealing was conducted under conditions shown in the following Table 10. In the Table 10, the amount of main materials in the annealing separator is shown as percent solid. Moreover, the amount of the bismuth chloride is shown as the amount compared with the total amount of MgO and $Al_2O_3$.

TABLE 10

| | | PRODUCTION CONDITIONS FINAL ANNEALING | | | | | | | |
|---|---|---|---|---|---|---|---|---|---|
| | | ANNEALING SEPARATOR | | | | | | | |
| | | MAIN MATERIALS | | | BISMUTH CHLORIDE | | | | |
| No. | STEEL TYPE | TYPE I or II | AMOUNT (TOTAL) mass % | $MgO/Al_2O_3$ mass ratio | TYPE | AMOUNT mass % | TEMPERATURE ° C. | TIME hour | REMOVING FILM |
| 4-1 | C-1 | I | 93 | 1:1 | BiOCl | 7 | 1200 | 20 | Not Conducted |
| 4-2 | C-2 | I | 93 | 1:1 | BiOCl | 7 | 1200 | 20 | Not Conducted |
| 4-3 | C-3 | II | 100 | 1:0 | None | — | 1200 | 20 | Conducted |
| 4-4 | C-4 | II | 100 | 1:0 | None | — | 1200 | 20 | Conducted |
| 4-5 | C-5 | I | 95 | 1:1 | BiOCl | 5 | 1200 | 20 | Not Conducted |
| 4-6 | C-6 | I | 95 | 1:1 | BiOCl | 5 | 1200 | 20 | Not Conducted |
| 4-7 | C-7 | I | 95 | 1:1 | BiOCl | 5 | 1200 | 20 | Not Conducted |
| 4-8 | C-8 | I | 95 | 1:1 | BiOCl | 5 | 1200 | 20 | Not Conducted |
| 4-9 | C-3 | I | 89 | 4:6 | BiOCl | 12 | 1200 | 20 | Not Conducted |
| 4-10 | C-4 | I | 96 | 4:6 | BiOCl | 4 | 1200 | 20 | Not Conducted |
| 4-11 | C-9 | I | 93 | 6:4 | BiOCl | 8 | 1200 | 20 | Not Conducted |
| 4-12 | C-10 | I | 97 | 6:4 | BiOCl | 3 | 1200 | 20 | Not Conducted |
| 4-13 | C-11 | I | 98 | 3:7 | BiOCl | 2 | 1200 | 20 | Not Conducted |
| 4-14 | C-12 | I | 93 | 7:3 | BiOCl | 7 | 1200 | 20 | Not Conducted |

※ "I" indicates "$MgO + Al_2O_3$" and "II" indicates "MgO" in the above table.

The redundant annealing separator is removed by water-washing from the obtained final annealed steel sheet. In any steel sheets except for the test numbers 4-3 and 4-4, the glass film (forsterite film) was not formed when confirmed by X-ray diffraction method. In the steel sheets of the test numbers 4-3 and 4-4, the forsterite film formed on the surface was removed by grinding or pickling the surface of the final annealed steel sheet after the final annealing. Thereafter, in any steel sheets, the glass film (forsterite film) was not formed when confirmed by X-ray diffraction method.

The steel sheets after removing the redundant annealing separator by water-washing (the steel sheets after removing the glass film in the test numbers 4-3 and 4-4) were subjected to the pickling treatment under conditions shown in the following Table 11. Herein, in the test numbers 4-1 and 4-2 shown in the Table 11, the pickling treatment in the oxidizing process was not conducted, and the oxygen concentration in the atmosphere during the heat treatment was 0 volume % (25 volume % of nitrogen and 75 volume % of hydrogen).

TABLE 11

| | | PRODUCTION CONDITIONS OXIDIZING PROCESS | | | | | | |
|---|---|---|---|---|---|---|---|---|
| | | | PICKLING | | HEAT TREATMENT | | | |
| No. | STEEL TYPE | WASHING WASHING METHOD | CONCENTRATION OF SULFURIC ACID mass % | TEMPERATURE ° C. | OXYGEN CONCENTRATION volume % | DEW POINT ° C. | TEMPERATURE ° C. | TIME seconds |
| 4-1 | C-1 | Water Washing | Not Conducted | Not Conducted | ※1 | −2 | 800 | 15 |
| 4-2 | C-2 | Water Washing | Not Conducted | Not Conducted | ※1 | −10 | 800 | 15 |
| 4-3 | C-3 | Water Washing | 15 | 75 | 20 | 10 | 800 | 20 |
| 4-4 | C-4 | Water Washing | 15 | 75 | 20 | 10 | 800 | 20 |
| 4-5 | C-5 | Water Washing | 15 | 75 | 20 | 10 | 800 | 20 |
| 4-6 | C-6 | Water Washing | 15 | 75 | 20 | 10 | 800 | 20 |
| 4-7 | C-7 | Water Washing | 15 | 75 | 20 | 10 | 800 | 20 |
| 4-8 | C-8 | Water Washing | 15 | 75 | 20 | 15 | 800 | 20 |

TABLE 11-continued

| | | PRODUCTION CONDITIONS OXIDIZING PROCESS | | | | | | | |
|---|---|---|---|---|---|---|---|---|---|
| | | | PICKLING | | HEAT TREATMENT | | | | |
| No. | STEEL TYPE | WASHING WASHING METHOD | CONCENTRATION OF SULFURIC ACID mass % | TEMPERATURE ° C. | OXYGEN CONCENTRATION volume % | DEW POINT ° C. | TEMPERATURE ° C. | TIME seconds |
| 4-9 | C-3 | Water Washing | 15 | 75 | 10 | 8 | 800 | 20 |
| 4-10 | C-4 | Water Washing | 15 | 75 | 15 | 15 | 800 | 20 |
| 4-11 | C-9 | Water Washing | 15 | 75 | 10 | 5 | 800 | 20 |
| 4-12 | C-10 | Water Washing | 15 | 75 | 15 | 15 | 800 | 20 |
| 4-13 | C-11 | Water Washing | 15 | 75 | 10 | 15 | 800 | 20 |
| 4-14 | C-12 | Water Washing | 15 | 75 | 15 | 20 | 800 | 20 |

※1: Oxygen concentration was 0% (25% of Nitrogen and 75% of Hydrogen)

The aqueous solution which mainly included aluminum phosphate and colloidal silica was applied to the steel sheets after the oxidizing process, the solution was baked at 850° C. for 1 minute except for the test numbers 4-1 and 4-2, the solution was baked at 850° C. for 30 minutes in the test numbers 4-1 and 4-2, and thereby, the tension-insulation coating whose coating weight was 4.5 g/$m^2$ was formed on the surface of the test piece. The laser beam was irradiated on the test piece in order to refine the magnetic domain.

The base steel sheets of the grain oriented electrical steel sheets were chemically analyzed on the basis of the above method. The chemical compositions are shown in Table 12. In regard to Table 9 and Table 12, the element whose value is blanc in the tables indicates the element in which the purposeful control is not conducted for the amount thereof during production.

TABLE 12

| | STEEL | PRODUCTION RESULTS CHEMICAL COMPOSITION OF BASE STEEL SHEET OF GRAIN ORIENTED ELECTRICAL STEEL SHEET (UNIT: mass %, BALANCE CONSISTING OF Fe AND IMPURITIES) | | | | | | | | | | | |
|---|---|---|---|---|---|---|---|---|---|---|---|---|---|
| No. | TYPE | C | Si | Mn | Xi | S + Se | sol. Al | N | Bi | Sb | Sn | Cr | Cu |
| 4-1 | C-1 | ≤0.002 | 3.35 | 0.081 | ≤0.005 | ≤ 0.005 | ≤ 0.005 | ≤0.005 | | | | | |
| 4-2 | C-2 | ≤0.002 | 3.25 | 0.082 | ≤0.005 | ≤0.005 | ≤0.005 | ≤0.005 | 0.0001 | | | | |
| 4-3 | C-3 | ≤0.002 | 3.30 | 0.082 | ≤0.005 | ≤0.005 | ≤0.005 | ≤0.005 | | | | | |
| 4-4 | C-4 | ≤0.002 | 3.30 | 0.083 | ≤0.005 | ≤ 0.005 | ≤ 0.005 | ≤0.005 | 0.0001 | | | | |
| 4-5 | C-5 | ≤0.002 | 3.30 | 0.082 | ≤0.005 | ≤ 0.005 | ≤0.005 | ≤0.005 | | 0.021 | | | |
| 4-6 | C-6 | ≤0.002 | 3.30 | 0.083 | ≤0.005 | ≤ 0.005 | ≤0.005 | ≤0.005 | 0.0001 | | 0.031 | | |
| 4-7 | C-7 | ≤0.002 | 3.30 | 0.082 | ≤0.005 | ≤ 0.005 | ≤0.005 | ≤0.005 | | | | 0.052 | |
| 4-8 | C-8 | ≤0.002 | 3.30 | 0.083 | ≤0.005 | ≤0.005 | ≤0.005 | ≤0.005 | 0.0001 | | | | 0.051 |
| 4-9 | C-3 | ≤0.002 | 3.30 | 0.082 | ≤0.005 | ≤0.005 | ≤0.005 | ≤0.005 | | | | | |
| 4-10 | C-4 | ≤0.002 | 3.30 | 0.083 | ≤0.005 | ≤0.005 | ≤0.005 | ≤0.005 | 0.0001 | | | | |
| 4-11 | C-9 | ≤0.002 | 3.30 | 0.082 | ≤0.005 | ≤0.005 | ≤0.005 | ≤0.005 | | 0.021 | | | |
| 4-12 | C-10 | ≤0.002 | 3.30 | 0.083 | ≤0.005 | ≤0.005 | ≤0.005 | ≤0.005 | 0.0001 | | 0.031 | | |
| 4-13 | C-11 | ≤0.002 | 3.30 | 0.082 | ≤0.005 | ≤0.005 | ≤0.005 | ≤0.005 | | | | 0.052 | |
| 4-14 | C-12 | ≤0.002 | 3.30 | 0.083 | ≤0.005 | ≤0.005 | ≤0.005 | ≤0.005 | 0.0001 | | | | 0.051 |

<Evaluation>

The fourier transform infrared spectroscopy, the average thickness of the iron oxide layer, the magnetic characteristics, and the adhesion of the tension-insulation coating were evaluated. The evaluation methods were the same as those in the above Example 1.

The obtained results are summarized in the following Table 13.

TABLE 13

| No. | STEEL TYPE | PRODUCTION RESULTS: FT-IR ABSORBANCE RATIO | PRODUCTION RESULTS: PRESENCE OR ABSENCE OF FORSTERITE | PRODUCTION RESULTS: THICKNESS OF IRON OXIDE LAYER nm | EVALUATION RESULTS: MAGNETIC CHARACTERISTICS $B_8$ T | EVALUATION RESULTS: MAGNETIC CHARACTERISTICS $W_{17/50}$ W/kg | EVALUATION RESULTS: ADHESION FRACTION OF REMAINED COATING AFTER ϕ20 BENDING | EVALUATION RESULTS: ADHESION FRACTION OF REMAINED COATING AFTER ϕ10 BENDING | REMARKS |
|---|---|---|---|---|---|---|---|---|---|
| 4-1 | C-1 | 0.1 | Absence | 20 | 1.925 | 0.741 | C | C | COMPARATIVE EXAMPLE |
| 4-2 | C-2 | 0.1 | Absence | 20 | 1.969 | 0.735 | C | C | COMPARATIVE EXAMPLE |
| 4-3 | C-3 | 2.3 | Absence | 370 | 1.931 | 0.702 | A | A | INVENTIVE EXAMPLE |
| 4-4 | C-4 | 2.5 | Absence | 405 | 1.971 | 0.632 | A | A | INVENTIVE EXAMPLE |
| 4-5 | C-5 | 2.3 | Absence | 385 | 1.933 | 0.701 | A | A | INVENTIVE EXAMPLE |
| 4-6 | C-6 | 2.5 | Absence | 405 | 1.973 | 0.631 | A | A | INVENTIVE EXAMPLE |
| 4-7 | C-7 | 2.3 | Absence | 375 | 1.933 | 0.701 | A | A | INVENTIVE EXAMPLE |
| 4-8 | C-8 | 2.5 | Absence | 405 | 1.973 | 0.630 | A | A | INVENTIVE EXAMPLE |
| 4-9 | C-3 | 2.8 | Absence | 390 | 1.930 | 0.703 | A | A | INVENTIVE EXAMPLE |
| 4-10 | C-4 | 2.8 | Absence | 410 | 1.970 | 0.634 | A | A | INVENTIVE EXAMPLE |
| 4-11 | C-9 | 2.7 | Absence | 395 | 1.932 | 0.703 | A | A | INVENTIVE EXAMPLE |
| 4-12 | C-10 | 3.1 | Absence | 415 | 1.972 | 0.637 | A | A | INVENTIVE EXAMPLE |
| 4-13 | C-11 | 3.2 | Absence | 385 | 1.934 | 0.712 | A | A | INVENTIVE EXAMPLE |
| 4-14 | C-12 | 3.1 | Absence | 410 | 1.974 | 0.639 | A | A | INVENTIVE EXAMPLE |

As clearly shown in the Tables 9 to 13, since the chemical compositions of the base steel sheets were satisfied and the production conditions were satisfied in the test numbers 4-3 to 4-14, both magnetic characteristics and adhesion of the tension-insulation coating were excellent. On the other hand, since the production conditions were not favorable in the test numbers 4-1 and 4-2, the adhesion of the tension-insulation coating was inferior.

REFERENCE SIGNS LIST

10 Grain oriented electrical steel sheet
11 Base steel sheet
13 Iron oxide layer
15 Tension-insulation coating

What is claimed is:

1. A grain oriented electrical steel sheet without a forsterite film characterized in that the grain oriented electrical steel sheet comprises:

a base steel sheet;

an oxide layer arranged in contact with the base steel sheet; and a tension-insulation coating arranged in contact with the oxide layer, wherein the base steel sheet includes, as a chemical composition, by mass %, 2.5 to 4.0% of Si,
0.05 to 1.00% of Mn,
0 to 0.01% of C,
0 to 0.005% of S+Se,
0 to 0.01% of sol.Al,
0 to 0.005% of N,
0 to 0.03% of Bi,
0 to 0.03% of Te,
0 to 0.03% of Pb,
0 to 0.50% of Sb,
0 to 0.50% of Sn,
0 to 0.50% of Cr,
0 to 1.0% of Cu, and a balance consisting of Fe and impurities, the oxide layer is an iron oxide layer, when the iron oxide layer is analyzed by a fourier transform infrared spectroscopy, when $A_{650}$ is an absorbance of an absorption peak detected at 650 $cm^{-1}$ in an infrared absorption spectrum, and when $A_{1250}$ is an absorbance of an absorption peak detected at 1250 $cm^{-1}$ in the infrared absorption spectrum, the $A_{650}$ and the $A_{1250}$ satisfy $0.2 \leq A_{650}/A_{1250} \leq 5.0$, and a magnetic flux density B8 in a rolling direction of the grain oriented electrical steel sheet is 1.90 T or more.

2. The grain oriented electrical steel sheet according to claim 1, wherein an average thickness of the iron oxide layer is 200 to 500 nm.

3. A forming method for an insulation coating of a grain oriented electrical steel sheet without a forsterite film characterized in that the forming method for the insulation coating includes an insulation coating forming process of forming a tension-insulation coating on a steel substrate, wherein, in the insulation coating forming process, a solution for forming the tension-insulation coating is applied to an oxide layer of the steel substrate and the solution is baked, wherein the steel substrate includes a base steel sheet and the oxide layer arranged in contact with the base steel sheet, the base steel sheet includes, as a chemical composition, by mass %, 2.5 to 4.0% of Si, 0.05 to 1.00% of Mn, 0 to 0.01% of C, 0 to 0.005% of S+Se, 0 to 0.01% of sol. Al, 0 to 0.005% of N, 0 to 0.03% of Bi, 0 to 0.03% of Te, 0 to 0.03% of Pb, 0 to 0.50% of Sb, 0 to 0.50% of Sn, 0 to 0.50% of Cr, 0 to 1.0% of Cu, and a balance consisting of Fe and impurities, the oxide layer is an iron oxide layer, and when the iron oxide layer is analyzed by a fourier transform infrared spectroscopy, when $A_{650}$ is an absorbance of an absorption peak detected at 650 $cm^{-1}$ in an infrared absorption spectrum, and when $A_{1250}$ is an absorbance of an absorption peak detected at 1250 $cm^{-1}$ in the infrared absorption spectrum, the $A_{650}$ and the $A_{1250}$ satisfy $0.2 \leq A_{650}/A_{1250} \leq 5.0$.

4. The forming method for the insulation coating of the grain oriented electrical steel sheet according to claim 3, wherein an average thickness of the iron oxide layer is 200 to 500 nm.

5. A producing method for the grain oriented electrical steel sheet without a forsterite film of claim 1 characterized in that the producing method includes a hot rolling process of heating and thereafter hot-rolling a steel piece to obtain a hot rolled steel sheet, a hot band annealing process of optionally annealing the hot rolled steel sheet to obtain a hot band annealed steel sheet, a cold rolling process of cold-rolling the hot rolled steel sheet or the hot band annealed steel sheet by cold-rolling once or by cold-rolling a plurality of times with an intermediate annealing to obtain a cold rolled steel sheet, a decarburization annealing process of decarburization-annealing the cold rolled steel sheet to obtain a decarburization annealed steel sheet, a final annealing process of applying an annealing separator to the decarburization annealed steel sheet and thereafter final-annealing the decarburization annealed steel sheet to obtain a final annealed steel sheet, an oxidizing process of conducting a washing treatment, a pickling treatment, and a heat treatment in turn for the final annealed steel sheet to obtain an oxidized steel sheet, an insulation coating forming process of applying a solution for forming a tension-insulation coating to a surface of the oxidized steel sheet and of baking the solution, wherein, in the hot rolling process, the steel piece includes, as a chemical composition, by mass %, 2.5 to 4.0% of Si, 0.05 to 1.00% of Mn, 0.02 to 0.10% of C, 0.005 to 0.080% of S+Se, 0.010 to 0.07% of sol.Al, 0.005 to 0.020% of N, 0 to 0.03% of Bi, 0 to 0.03% of Te, 0 to 0.03% of Pb, 0 to 0.50% of Sb, 0 to 0.50% of Sn, 0 to 0.50% of Cr, 0 to 1.0% of Cu, and a balance consisting of Fe and impurities, and wherein, in the oxidizing process, as the washing treatment, a surface of the final annealed steel sheet is washed, as the pickling treatment, the final annealed steel sheet is pickled using a sulfuric acid of 5 to 20 mass %, and as the heat treatment, the final annealed steel sheet is held in a temperature range of 700 to 850° C. for 10 to 50 seconds in an atmosphere where an oxygen concentration is 5 to 21 volume % and a dew point is ~ 10 to 30° C.

6. The producing method for the grain oriented electrical steel sheet according to claim 5, wherein, in the final annealing process, the annealing separator includes MgO of 60 mass % or more, and a forsterite film formed on a surface is removed by grinding or pickling the surface of the final annealed steel sheet after final annealing.

7. The producing method for the grain oriented electrical steel sheet according to claim 5, wherein, in the decarburization annealing process, when S1 is an average heating rate in units of ° C./second in a temperature range of 500° C. or more and less than 600°° C. during raising a temperature of the cold rolled steel sheet and when S2 is an average heating rate in units of ° C./second in a temperature range of 600°° C. or more and 700° C. or less during raising the temperature of the cold rolled steel sheet, the S1 and the S2 satisfy $300 \leq S1 \leq 1000$, $1000 \leq S2 \leq 3000$, and $1.0 < S2/S1 \leq 10.0$.

8. The producing method for the grain oriented electrical steel sheet according to claim 6, wherein, in the decarburization annealing process, when S1 is an average heating rate in units of ° C./second in a temperature range of 500° C. or more and less than 600° C. during raising a temperature of the cold rolled steel sheet and when S2 is an average heating rate in units of ° C./second in a temperature range of 600° C. or more and 700° C. or less during raising the temperature of the cold rolled steel sheet, the S1 and the S2 satisfy $300 \leq S1 < 1000$, $1000 \leq S2 < 3000$, and $1.0 < S2/S1 \leq 10.0$.

9. The producing method for the grain oriented electrical steel sheet according to claim 5, wherein, in the hot rolling process, the steel piece includes, as the chemical composition, by mass %, at least one of 0.0005 to 0.03% of Bi, 0.0005 to 0.03% of Te, and 0.0005 to 0.03% of Pb.

10. A grain oriented electrical steel sheet without a forsterite film characterized in that the grain oriented electrical steel sheet comprises:

a base steel sheet;

an oxide layer arranged in contact with the base steel sheet; and a tension-insulation coating arranged in contact with the oxide layer, wherein the base steel sheet includes, as a chemical composition, by mass %, 2.5 to 4.0% of Si, 0.05 to 1.00% of Mn, 0 to 0.01% of C, 0 to 0.005% of S+Se, 0 to 0.01% of sol.Al, 0 to 0.005% of N, 0 to 0.03% of Bi, 0 to 0.03% of Te, 0 to 0.03% of Pb, 0 to 0.50% of Sb, 0 to 0.50% of Sn, 0 to 0.50% of Cr, 0 to 1.0% of Cu, and a balance comprising Fe and impurities, the oxide layer is an iron oxide layer, when the iron oxide layer is analyzed by a fourier transform infrared spectroscopy, when $A_{650}$ is an absorbance of an absorption peak detected at 650 $cm^{-1}$ in an infrared absorption spectrum, and when $A_{1250}$ is an absorbance of an absorption peak detected at 1250 $cm^{-1}$ in the infrared absorption spectrum, the $A_{650}$ and the $A_{1250}$ satisfy $0.2 \le A_{650}/A_{1250} \le 5.0$, and a magnetic flux density B8 in a rolling direction of the grain oriented electrical steel sheet is 1.90 T or more.

11. A forming method for an insulation coating of a grain oriented electrical steel sheet without a forsterite film characterized in that the forming method for the insulation coating includes an insulation coating forming process of forming a tension-insulation coating on a steel substrate, wherein, in the insulation coating forming process, a solution for forming the tension-insulation coating is applied to an oxide layer of the steel substrate and the solution is baked, wherein the steel substrate includes a base steel sheet and the oxide layer arranged in contact with the base steel sheet, the base steel sheet includes, as a chemical composition, by mass %, 2.5 to 4.0% of Si, 0.05 to 1.00% of Mn, 0 to 0.01% of C, 0 to 0.005% of S+Se, 0 to 0.01% of sol.Al, 0 to 0.005% of N, 0 to 0.03% of Bi, 0 to 0.03% of Te, 0 to 0.03% of Pb, 0 to 0.50% of Sb, 0 to 0.50% of Sn, 0 to 0.50% of Cr, 0 to 1.0% of Cu, and a balance comprising Fe and impurities, the oxide layer is an iron oxide layer, and when the iron oxide layer is analyzed by a fourier transform infrared spectroscopy, when $A_{650}$ is an absorbance of an absorption peak detected at 650 $cm^{-1}$ in an infrared absorption spectrum, and when $A_{1250}$ is an absorbance of an absorption peak detected at 1250 $cm^{-1}$ in the infrared absorption spectrum, the $A_{650}$ and the $A_{1250}$ satisfy $0.2 \le A_{650}/A_{1250} \le 5.0$.

12. A producing method for the grain oriented electrical steel sheet without a forsterite film of claim 1 characterized in that the producing method includes a hot rolling process of heating and thereafter hot-rolling a steel piece to obtain a hot rolled steel sheet, a hot band annealing process of optionally annealing the hot rolled steel sheet to obtain a hot band annealed steel sheet, a cold rolling process of cold-rolling the hot rolled steel sheet or the hot band annealed steel sheet by cold-rolling once or by cold-rolling a plurality of times with an intermediate annealing to obtain a cold rolled steel sheet, a decarburization annealing process of decarburization-annealing the cold rolled steel sheet to obtain a decarburization annealed steel sheet, a final annealing process of applying an annealing separator to the decarburization annealed steel sheet and thereafter final-annealing the decarburization annealed steel sheet to obtain a final annealed steel sheet, an oxidizing process of conducting a washing treatment, a pickling treatment, and a heat treatment in turn for the final annealed steel sheet to obtain an oxidized steel sheet, an insulation coating forming process of applying a solution for forming a tension-insulation coating to a surface of the oxidized steel sheet and of baking the solution, wherein, in the hot rolling process, the steel piece includes, as a chemical composition, by mass %, 2.5 to 4.0% of Si, 0.05 to 1.00% of Mn, 0.02 to 0.10% of C, 0.005 to 0.080% of S+Se, 0.010 to 0.07% of sol.Al, 0.005 to 0.020% of N, 0 to 0.03% of Bi, 0 to 0.03% of Te, 0 to 0.03% of Pb, 0 to 0.50% of Sb, 0 to 0.50% of Sn, 0 to 0.50% of Cr, 0 to 1.0% of Cu, and a balance comprising Fe and impurities, and wherein, in the oxidizing process, as the washing treatment, a surface of the final annealed steel sheet is washed, as the pickling treatment, the final annealed steel sheet is pickled using a sulfuric acid of 5 to 20 mass %, and as the heat treatment, the final annealed steel sheet is held in a temperature range of 700 to 850° C. for 10 to 50 seconds in an atmosphere where an oxygen concentration is 5 to 21 volume % and a dew point is-10 to 30° C.

13. The grain oriented electrical steel sheet according to claim 10, wherein an average thickness of the iron oxide layer is 200 to 500 nm.

* * * * *